US012101735B1

(12) United States Patent
Anand et al.

(10) Patent No.: US 12,101,735 B1
(45) Date of Patent: *Sep. 24, 2024

(54) MOBILE GROUND EQUIPMENT LOCATION MONITORING SYSTEMS AND METHODS

(71) Applicant: AMERICAN AIRLINES, INC., Fort Worth, TX (US)

(72) Inventors: Arul Anand, Frisco, TX (US); Michael Alan Humphrey, Corinth, TX (US); Jose Vazquez, Bedford, TX (US); Lucas Warner Lemasters, Argyle, TX (US); Moonhee Kwak, Carrollton, TX (US); Deepak Mani, Irving, TX (US); Rajendra Prasad Nuvvula, Fort Worth, TX (US); Chandrajeet Patil, Carrollton, TX (US); Obula Reddy Sana, Irving, TX (US); Javeed Shaik, Frisco, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,754

(22) Filed: Feb. 27, 2023

Related U.S. Application Data

(63) Continuation of application No. 17/104,669, filed on Nov. 25, 2020, now Pat. No. 11,595,932.

(60) Provisional application No. 62/940,660, filed on Nov. 26, 2019.

(51) Int. Cl.
*H04W 64/00* (2009.01)

(52) U.S. Cl.
CPC ............................... *H04W 64/003* (2013.01)

(58) Field of Classification Search
CPC ................................................. H04W 64/003
See application file for complete search history.

(56) References Cited

FOREIGN PATENT DOCUMENTS

WO    WO-2019186594 A1 * 10/2019

* cited by examiner

*Primary Examiner* — Justin Y Lee
(74) *Attorney, Agent, or Firm* — HAYNES AND BOONE, LLP

(57) ABSTRACT

A system that includes a plurality of IoT devices associated with ground equipment items, a plurality of gateways to receive data from the IoT devices, and an application that receives the data from the IoT devices, is used to manage mobile ground equipment within an airport and track flight data to match available, working equipment with turnarounds and/or flights based on flight data requirements, predicted turn time, gate position, required special needs equipment, and working/failed equipment.

54 Claims, 14 Drawing Sheets

MOBILE GROUND EQUIPMENT LOCATION MONITORING SYSTEMS AND METHODS

CROSS-REFERENCE TO RELATED APPLICATIONS

This application is a continuation of U.S. application Ser. No. 17/104,669, filed Nov. 25, 2020, which claims the benefit of the filing date of, and priority to, U.S. Application No. 62/940,660, filed Nov. 26, 2019, the entire disclosures of which are hereby incorporated herein by reference.

BACKGROUND

One aircraft is often used for multiple flights each day. As such, when the aircraft completes one flight, the aircraft is then readied for the next flight. This process is often referred to as gate turnaround and the amount of time required to deplane, board the plane, and prepare the aircraft for departure is referred to as turnaround time. The gate turnaround process occurs at a gate of a terminal. With gate availability often being limited, if the gate turnaround time exceeds a target turnaround time, then flight delays can result for the turnaround or next flight and other downstream flights. A gate turnaround involves multiple activities completed by a wide variety of entities and requires multiple pieces of ground equipment. Some activities are dependent upon the completion of another activity. For example, the passengers must deplane before the new passengers are boarded. When a piece of ground equipment that is required for the passengers to deplane, such as a wheelchair lift, is delayed, the boarding of new passengers is also delayed. As such, delays to the completion of one activity can cause delays to "downstream" activities.

Conventionally, the ground equipment required for each turnaround is obtained via a visual inspection of the surrounding areas by a crew chief or other airline employee. Often, the crew chief walks through the terminal searching for a piece of ground equipment without knowing whether the equipment is in the vicinity or not. This process prolongs the time required to obtain the necessary ground equipment and can cause the target turnaround time to be exceeded.

Moreover, submitting a maintenance request associated with a mobile ground equipment item is currently not streamlined and results in large amounts of memory and processing for computers that are processing the maintenance requests. Often, the application used to create and/or submit the maintenance request is different from the application used to manage and track maintenance requests. As such, reformatting and/or reconfiguration of the maintenance request is required before entering the request in the maintenance management and tracking application, which requires additional memory and processing load.

DETAILED DESCRIPTION

Figure 1:
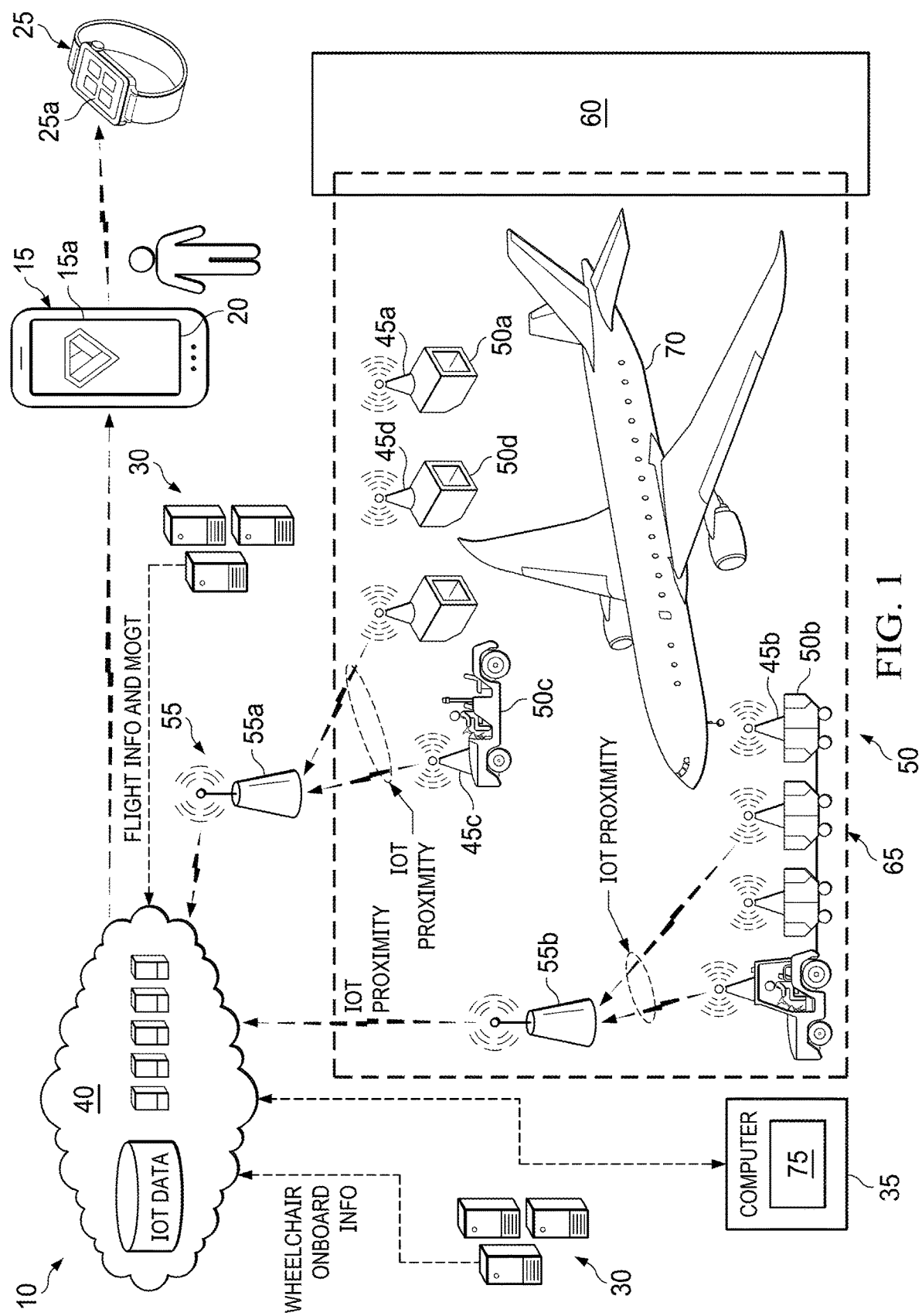
FIG. 1 is a diagrammatic illustration of a ground equipment location monitoring system according to an example embodiment, the system including a remote user device comprising a graphical user interface ("GUI") that is configured to display a plurality of windows.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In some embodiments, a predicted turn time or predicted turnaround time is the predicted time required to "turn" an aircraft between consecutive flights. As flight schedules are often based on predicted turn times, the ability for an actual turn time to be less than or equal to the predicted turn time is important in preventing flight and crew delays. To improve actual turn times, the system addresses issues with mobile ground equipment tracking, availability, and procurement. The system manages equipment to match available, working equipment with flights based on flight data requirements, predicted turn times, gate positions, required special needs equipment, and listings of working/failed equipment. Generally, the predicted turn time or turnaround time is defined by the time period beginning when the aircraft touches down on at the airport and ends when the aircraft pushes off from a gate.

In an example embodiment, as illustrated in FIG. 1, a system is generally referred to by the reference numeral 10 and includes a remote user device 15 that includes a graphical user display ("GUI") 15a capable of displaying a screen or window 20 to a user of the remote user device 15; a remote user device 25 that is configured to be in communication with the remote user device 15 and that has a GUI 25a capable of displaying a window; a plurality of data sources 30; and a computer 35, all of which are operably connected via a network 40. The system 10 also includes a plurality of IoT devices 45, such as devices 45a, 45b, 45c, 45d, that is configured to be attached to a plurality of ground equipment items 50, such as items 50a, 50b, 50c, and 50d. Generally, the ground equipment items, which are also referred to as pieces of mobile ground equipment, are mobile in that they can be moved between locations. The system 10 also includes a plurality of gateways 55, such as gateways 55a and 55b, that is positioned within or next to an airport terminal 60, such as within a gate 65. Generally, the gate 65 is configured such that an aircraft 70 parks next to or within the gate 65 and is attached to the terminal 60 via a skybridge and the like. In some embodiments, the system 10 also includes a ground equipment manager ("GEM") application 75 that is in communication with at least a portion of the other components of the system 10 via the network 40. In some embodiments, a portion of the GEM application 75 is stored in the computer 35.

Figure 2:
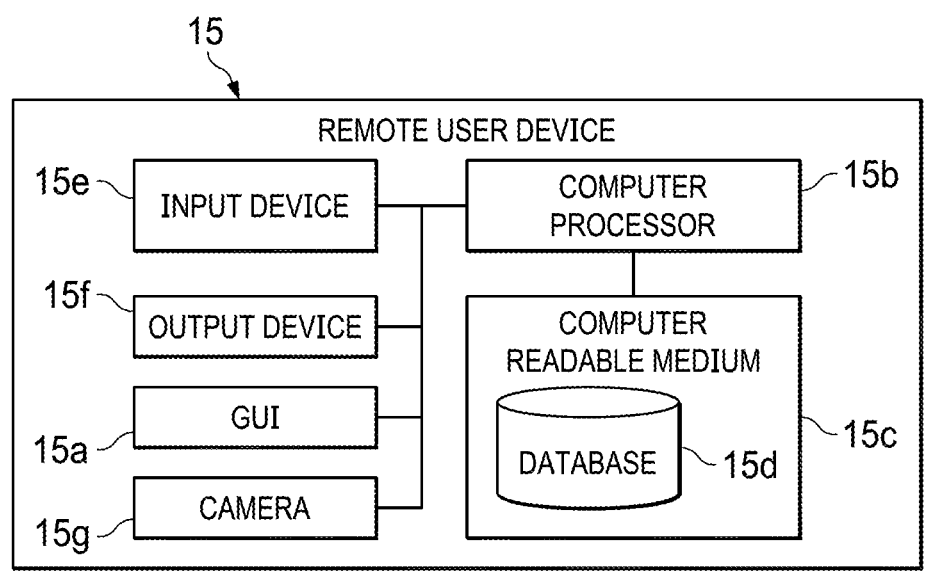
FIG. 2 is a diagrammatic illustration of the remote user device of FIG. 1, according to an example embodiment.

In an example embodiment, as illustrated in FIG. 2 with continuing reference to FIG. 1, the remote user device 15 includes the GUI 15a, a computer processor 15b and a computer readable medium 15c operably coupled thereto.

Instructions accessible to, and executable by, the computer processor 15b are stored on the computer readable medium 15c. A database 15d is also stored in the computer readable medium 15c. Generally, the GUI 15a can display a plurality of windows or screens to the user. The remote user device 15 also includes an input device 15e and an output device 15f. In some embodiments, the input device 15e and the output device 15f are the GUI 15a. In some embodiments, the user provides inputs to the system 10 via a window that is displayed on the GUI 15a. However, the input device 15e can also be a microphone in some embodiments and the output device 15f is a speaker. In some embodiments, the remote user device 15 also includes a camera 15g, an augmented reality ("AR") camera, and/or a camera that is otherwise configured to estimate dimensions and depths of an object. In several example embodiments, the remote user device 15 is, or includes, a telephone, a personal computer, a personal digital assistant, a cellular telephone or mobile phone, other types of telecommunications devices, other types of computing devices, and/or any combination thereof. In several example embodiments, the remote user device 15 includes a plurality of remote user devices.

In some embodiments, the remote user device 25 is similar to the remote user device 15 and in some instances is identical to the remote user device 25. However, in some embodiments the remote user device 25 is a wearable device that is in communication with the remote user device 15 via Bluetooth or other local network. In some embodiments, the remote user device 25 is a watch, an armband, glasses, etc.

In some embodiments, the plurality of data sources 30 includes data sources that include data relating to upcoming flight plans of users or customers, flight schedules, flight numbers and origination location and departure destination for each flight number, passenger data, etc. In one embodiment, the plurality of data sources 30 includes data relating to flight operations. In one embodiment, the plurality of data sources 30 includes data relating to a flight from a plurality of flights, the flight using an airplane and having a departure location and a destination location. Generally, flights are scheduled such that one airplane has a destination location that is then the departure location for the next flight associated with that aircraft. As noted above, a gate turnaround is completed between the flights to ready the aircraft for the next flight. When the gate turnaround exceeds the predicted turn time, the next aircraft that is scheduled to turnaround at the gate may be delayed as well as other downstream flights. In some embodiments, the plurality of data sources 30 includes FlightHub, Azure Cloud, Mongo Atlas, Apple Xcode, iOS SDK, Swift 5, Sabre, Amadeus, Springboot Microservices, and Mosaic.

In some embodiments, the computer 35 is similar or identical to the remote user device 15 in that it includes a GUI, computer processor and a computer readable medium operably coupled thereto. Instructions accessible to, and executable by, the computer processor are stored on the computer readable medium. A database is also stored in the computer readable medium. Generally, the GUI can display a plurality of windows or screens to the user. The computer also includes an input device and an output device. In some embodiments, the input device and the output device are the GUI.

In an example embodiment, the network 40 includes the Internet, one or more local area networks, one or more wide area networks, one or more cellular networks, one or more wireless networks, one or more voice networks, one or more data networks, one or more communication systems, and/or any combination thereof. In some embodiments, the network 40 also includes WIFI, Bluetooth, and Long-Term Evolution ("LTE") or other wireless broadband communication technology.

In some embodiments, an IoT device of the plurality of IoT devices 45 repeatedly transmits a signal that other devices can receive and recognize. Generally, an IoT device of the plurality of IoT devices 45 includes a memory and a transmitter. In some embodiments, the memory stores data used to identify the ground equipment item to which the IoT device is coupled. In some embodiments, the transmitter is configured for wired or wireless communication with one or more other devices. In some embodiments, an IoT device of the plurality of IoT devices 45 includes or is capable of being coupled to one or more sensors and a processor. The one or more sensors may include a level, a location sensor, a pitch sensor, a light intensity sensor, a pressure sensor, a proximity sensor, a temperature sensor, and/or a speed sensor or sensor configured to detect the speed of linear movement of the ground equipment item to which the IoT device is coupled. In some embodiments, an IoT device of the plurality of IoT devices 45 includes an output device, such as a visual output such as a light or an audible output such as a speaker. In some embodiments, an IoT device of the plurality of IoT devices 45 is configured to have a range of about 400 meters, but the range may be 50 meters, 200 meters, 300 meters, 10 meters, and the like depending on the ground equipment item to which the IoT device is coupled. In some embodiments, the IoT devices 45 are beacons or "tags." In some embodiments, the IoT devices 45 emit an encrypted signal that is capable of being received and read by Blue-tooth equipped devices, such as a remote user device 15 and/or the gateways 55. Generally, the encrypted signal includes the beacon's unique ID, the strength of the signal, and data from any sensors that are associated with the beacon. In some embodiments, each IoT device is a beacon and at least a location sensor.

In some embodiments, the ground equipment items 50 include items needed to complete a turn or turnaround of an aircraft. In some embodiments, the ground equipment item 50a is a wheelchair lift, a tug, a belt loader, a pushout tractor, a bag cart, a dolly, a unit load device, a cargo pallet, chocks, a bus, a container loader, a transporter, an aircraft tripod jack, aircraft service stairs, a refueler, a highspeed tractor, an Air Start Unit or start cart, catering vehicle(s), passenger boarding steps/stairs, de/anti-icing vehicles, a ground power unit ("GPU"), a PCA, or a lavatory ("LAV") truck. Generally, the item 50a is mobile and often a resource shared among a plurality of gates in the terminal 60.

In some embodiments, a gateway of the plurality of gateways 55 includes a receiver, a memory, a transmitter, and a processor. Generally, a gateway of the plurality of gateways 55 is configured to collect messages or signals from one or more IoT devices of the plurality of IoT devices 45, store data, pre-process the data, and/or send the messages, data, and/or results relating to the processed data to the computer 35 and/or the GEM application 75.

In some embodiments, the terminal 60 includes a building and a portion external to the building. Generally, the terminal 60 forms a portion of an airport.

In some embodiments, the gate 65 includes an internal portion of the terminal 60, a jet bridge, and a portion external to the terminal 60 such as a portion of an airport apron. Generally, the airport apron, ramp, or tarmac, is the area of the airport in which aircraft are parked, unloaded, loaded, refueled, and/or boarded. In some embodiments, one or more of the gateways 55 is positioned in or near the gate 65 and one or more ground equipment items of the plurality of ground equipment items 50 is positioned in or near the gate 65. While only one gate (i.e., gate 65) is illustrated in FIG. 1, it is understood that the gate 65 is one of a plurality of gates, which are identical or similar to the gate 65, at the terminal 60.

In one or more example embodiments, the GEM application 75 is stored in the computer readable medium of the computer 35 and/or is stored in the cloud. In some embodiments, the GEM application 75 is a mobile application developed in the iOS platform. In some embodiments, the GEM application 75 includes and/or executes one or more web-based programs, Intranet-based programs, and/or any combination thereof. In an example embodiment, the GEM application 75 includes a computer program including a plurality of instructions, data, and/or any combination thereof. In an example embodiment, the application is written in, for example, HyperText Markup Language (HTML), Cascading Style Sheets (CSS), JavaScript, Extensible Markup Language (XML), asynchronous Javascript and XML (Ajax), iOS, xCode, Swift, Android for mobile, and/or any combination thereof. In an example embodiment, the GEM application 75 is a web-based application written in, for example, Java or Adobe Flex, which pulls real-time information from the plurality of IoT devices 45, the plurality of gateways 55, a data source from the plurality of data sources 30, and/or one or more of the remote user devices 15 and 25. In an example embodiment, the GEM application 75 pulls real-time information upon the execution, opening or start-up of the GEM application 75. In some embodiments, the GEM application 75 is or includes a mobile application downloaded on the remote user device 15 and/or remote user device 25 of the user. Generally, the GEM application 75 includes a mobile front-end application and a backend application. Generally, the mobile front-end application communicates with the backend application to push data to the ground crew managers regarding the ground equipment items 50.

Generally, the system 10 tracks the location and availability of ground equipment items 50 associated with the airport, such as the terminal 60. The GEM application 75 provides a listing of needed, missing ground equipment and the availability of that needed, missing ground equipment based on the data received from the plurality of IoT devices 45.

Figure 3:
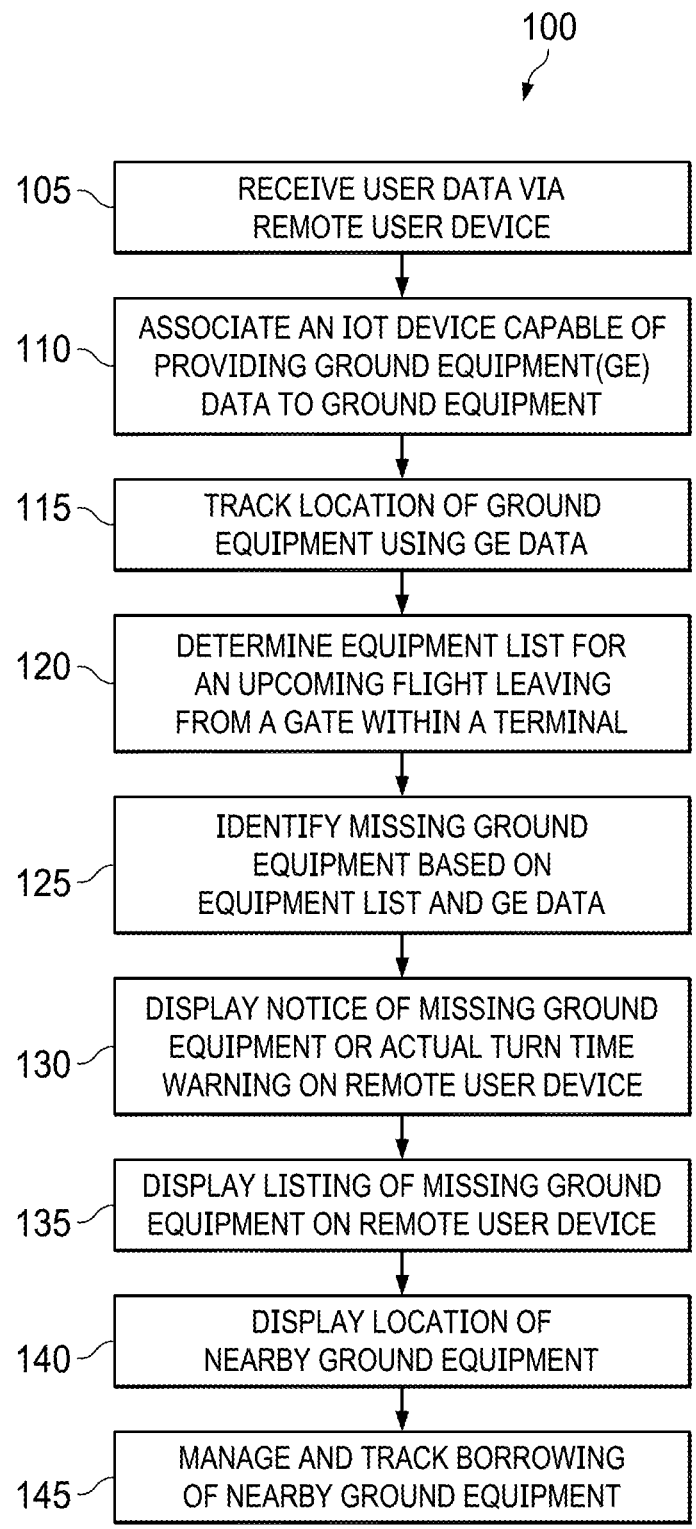
FIG. 3 is a flow chart illustration of a method of operating the system of FIGS. 1-2, according to an example embodiment.

In an example embodiment, as illustrated in FIG. 3 with continuing reference to FIGS. 1 and 2, a method 100 of operating the system 10 includes receiving user data via a remote user device at step 105; associating an IoT device capable of providing ground equipment ("GE") data to ground equipment items at step 110; tracking the location of the ground equipment using the GE data at step 115; determining the equipment list for an upcoming flight leaving from a gate within the terminal at step 120; identifying missing ground equipment based on the equipment list and the GE data at step 125; displaying a notice of missing ground equipment or actual turn time warning on the remote user device at step 130; displaying a listing of missing ground equipment on the remote user device at step 135; displaying the location of nearby ground equipment at step 140; and managing and tracking the borrowing of nearby ground equipment at step 145.

Figure 5:
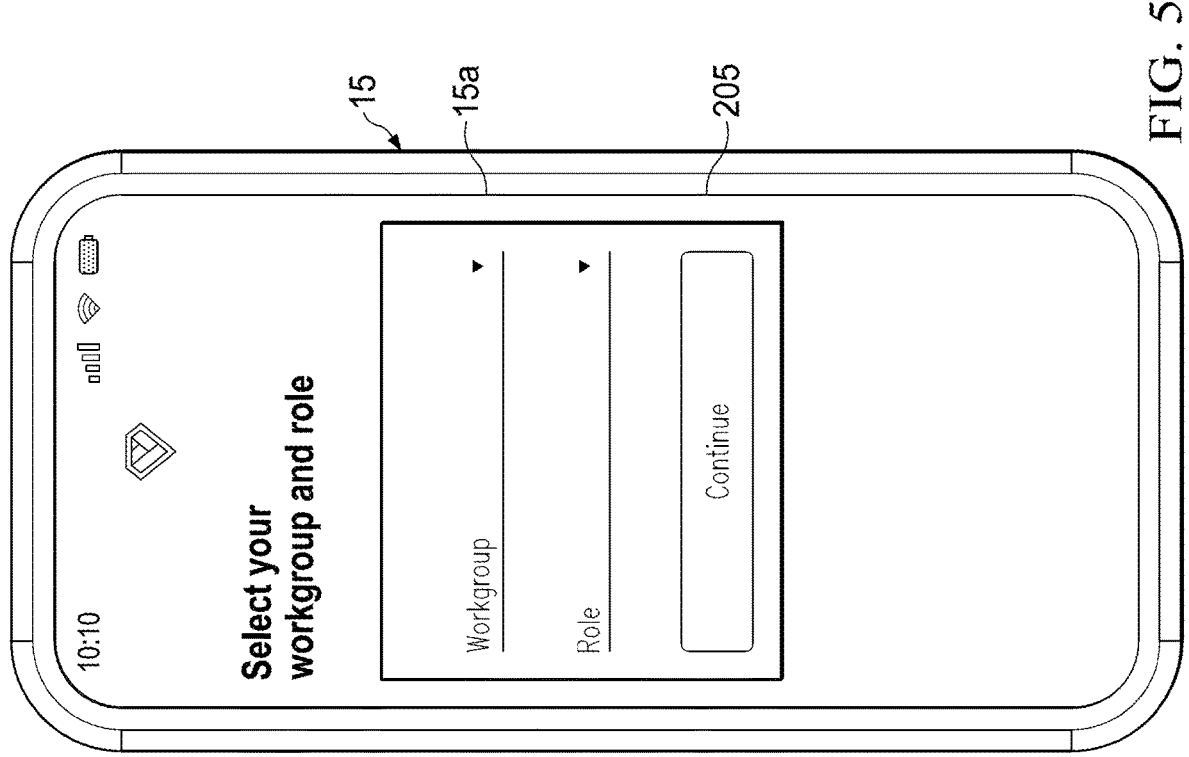
FIGS. 4-22 are illustrations of windows displayed on the GUI of the remote user device of FIG. 1, according to an example embodiment.
Figure 4:
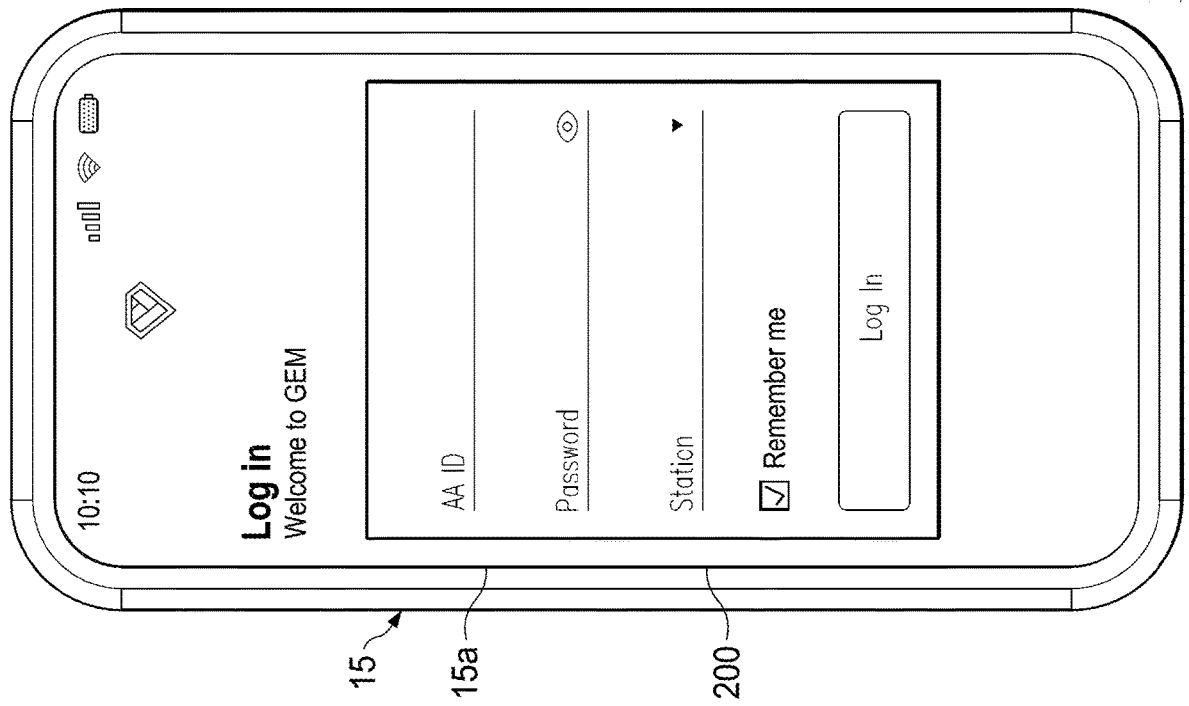

In one embodiment and at step 105, the system 10 receives user data via the remote user device 15. In one embodiment and as illustrated in FIG. 4, the system 10 displays a window 200 on the GUI 15a of the remote user device 15. The window 200 includes data entry elements and associated prompts that are configured to receive user data such as an employee number or other identifier, a password, and a location/role associated with the user of the remote user device 15. In one embodiment and as illustrated in FIG. 5, the system 10 displays a window 205 on the GUI 15a of the remote user device 15. The window 205 includes data entry elements and associated prompts that are configured to receive user data such as a workgroup and role of the employee or user.

In one embodiment and at the step 110, an IoT device is associated with a ground equipment item, with the IoT device configured to provide GE data to the system 10. In some embodiments and referring back to FIG. 1, one or more IoT devices is/are coupled to a ground equipment item. Generally, the IoT device is selected based on the type of equipment to which it will be attached or coupled. For example, for ground equipment that is highly mobile, or expected to travel further distances from the gateways (e.g., drivable equipment items that may be driven long distances away from a terminal structure), the IoT device will have a higher, longer signal range than an IoT device that is coupled to a ground equipment item that has a lower mobility range (e.g., not expected to leave a terminal structure). Generally, each IoT device is configured to emit a location signal, which is GE data. In some embodiments and, for example, when the ground equipment item is a drivable piece of equipment, the IoT device may be configured to detect the speed of linear movement of the piece of equipment, the pitch of the piece of equipment (e.g., whether the equipment is "level") to detect a potential flat tire or other maintenance issue, a temperature sensor to detect the ambient temperature of the equipment or an internal temperature of the equipment, etc. An IoT device may be permanently coupled or temporarily coupled to the ground equipment item. In some embodiments, each of the IoT devices includes data relating to the equipment to which it is coupled or associated with. For example, the IoT device may include an age, model, maintenance record (past and predicted or scheduled), an image of the equipment or type of equipment, use history, etc. associated with the equipment to which it is coupled.

In one embodiment and at the step 115, the system 10 tracks the location of the ground equipment items using the GE data. Referring back to FIG. 1, the gateways 55 receive the GE data emitted from the IoT devices 45, with the GE data including at least the location of the ground equipment. The gateways 55 send all or a portion of the GE data to the computer 35 and/or to the GEM application 75, with the GEM application 75 tracking the location of the ground equipment. As such, the GEM application 75 can identify the types of ground equipment within the vicinity of the gate 65.

In one embodiment and at the step 120, the system 10 determines an equipment list that includes needed mobile ground equipment for an upcoming flight and/or a turnaround associated with the flight arriving/leaving from the gate 65. In some embodiments, the GEM application 75 accesses flight data, gate scheduling data, and passenger data to generate the equipment list. In other embodiments, the equipment list is provided to the GEM application 75. Generally, the needed mobile ground equipment includes types of needed mobile ground equipment and a number for each type needed. Considering a turnaround often involves the unloading of a first flight and preparation of a second, subsequent flight, the passenger data for both the first and second flights are accessed to determine, for example, if a wheelchair is needed for the unloading or loading of passengers in either the first or second flight. However, such as at the beginning of the day, there is no incoming flight to deplane and the step 120 includes determining the equipment list for the upcoming flight leaving for the gate 65.

In one embodiment and at the step 125, the system 10 identifies missing or unavailable ground equipment based on the equipment list and the GE data. In some embodiments, the GEM application 75 identifies the unavailable ground equipment by comparing the equipment list with the location of the closest equipment (based on the GE data) to the gate 65. In some embodiments, when the closest equipment within an equipment type is beyond a distance threshold, the equipment type is considered missing or unavailable. In some embodiments, when the closest equipment within an equipment type is within the distance threshold but has a status such as checked-out, then the equipment type is considered missing or unavailable. As such, the GEM application 75 determines if a type of needed mobile ground equipment is available or unavailable at a location based on the status (e.g., checked-out, need maintenance) and/or the location (e.g., beyond a distance threshold) of each piece of mobile ground equipment.

Figure 6:
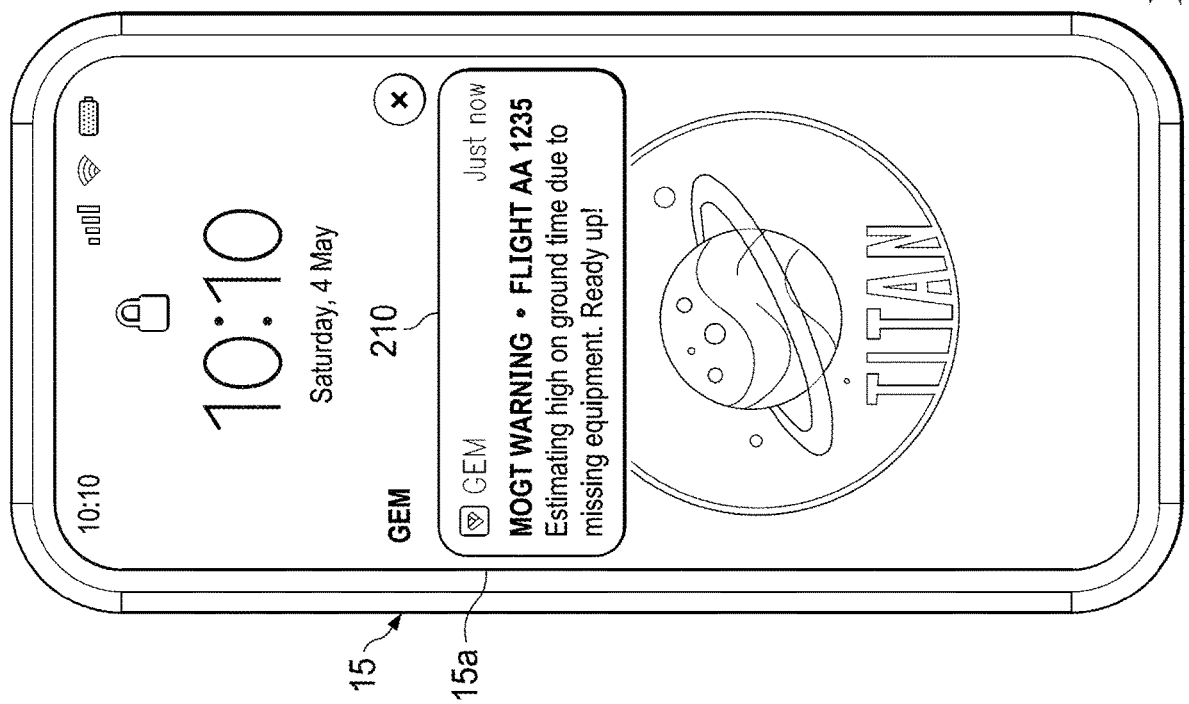

In some embodiments and at the step 130, the GEM application 75 displays a notice of unavailable or missing ground equipment or actual turn time warning on the remote user device 15. In some embodiments and as illustrated in FIG. 6, the notice of unavailable or missing ground equipment or actual turn time warning may be or include a push notification 210 that is received by the remote user device 15 and displayed on the GUI 15a of the remote user device 15. As illustrated, the push notification 210 indicates that there is a MOGT warning associated with flight AA1235 and that the system 10 is estimating high on-ground-time due to unavailable or missing equipment. As illustrated, the GEM application 75 has identified unavailable or missing equipment needed to prepare for the flight AA1235 and determined that the actual turn time is likely to exceed the predicted turn time (e.g., MOGT). As such, the system 10 is notifying the user associated with the flight AA1235 that there is unavailable or missing equipment and provides a warning that the predicted turn time will likely be exceeded. In some embodiments, however, the notice is displayed on the GUI 25a of the remote user device 25. Generally, when the remote user device 15 receives an indication that the user has selected the push notification 210, the GEM application 75 is opened to display additional information on the remote user device 15. A similar process may occur with the remote user device 25, with the push notification being selectable to display additional, relevant information on the GUI 25a of the remote user device 25.

Figure 7:
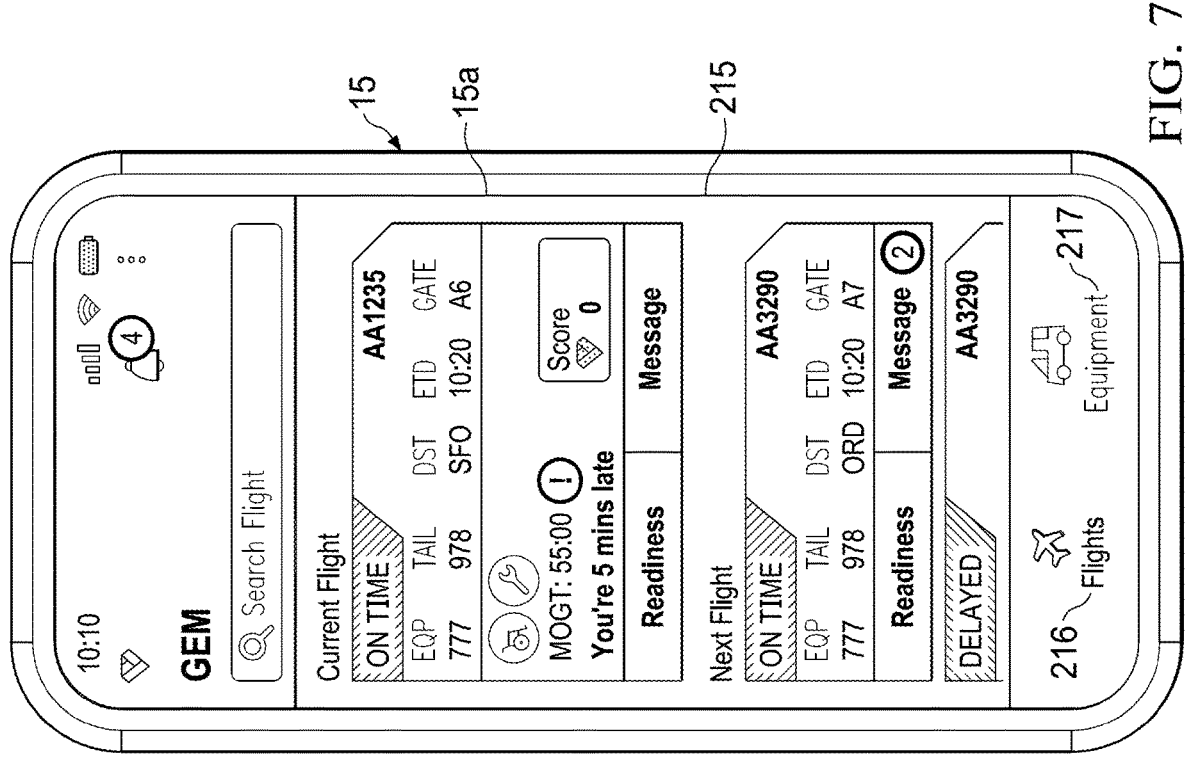

In some embodiments and at the step 135, the GEM application 75 displays the listing of unavailable or missing ground equipment on the remote user device 15. As illustrated in FIG. 7, a window 215 is displayed on the GUI 15a of the remote user device 15. In some embodiments, the window 215 is displayed in response to the selection of the push notification 210. The window 215 includes a listing of flights associated with the user and/or a location such as a gate or range of gates. For example, and as illustrated, the window 215 includes a "Current Flight" that is indicated as "On Time" with flight number AA1235 and a "Next Flight" portion that includes an "On Time" flight number AA3290 and a "Delayed" flight number AA3290. The window 215 also includes a selectable "flight" button 216 and a selectable "equipment" button 217.

The "Current Flight" displayed on the window 215 of flight number AA1235 is listed as having "EQP" of 777, "TAIL" of 978, "DST" of SFO, "ETD" of 10:20, and "GATE" of A6. As such, the type of aircraft is a 777, the tail number of the aircraft is 978, the destination is San Francisco, the estimated time of departure is 10:20 and the aircraft is expected to push back from gate A6. The "Current Flight" is also associated with two icons, with one icon depicting a wheelchair and the other icon depicting a wrench. In some embodiments, the presence of icons, such as the wheelchair and wrench icon, is the listing of unavailable or missing ground equipment. The "Current Flight" is also associated with a MOGT of 55 minutes, which is the predicted turn time associated with this turn. An alert icon or other indicator is positioned next to "MOGT: 55:00", which is associated with a predicted turn time of 55 minutes, with an indication that the actual turn time is 5 minutes later than the predicted turn time or is predicted to be 5 minutes later than the predicted turn time. The "Current Flight" is also associated with a "Readiness" selectable button and a "Message" selectable button. The "Current Flight" is also associated with a "Score" and an icon of a gem with score of zero. In some embodiments, the display of the icons is a listing of unavailable or missing ground equipment. In some embodiments, the wheelchair icon indicates that a wheelchair lift is required but unavailable or missing.

The "Next Flight" displayed on the window 215 that is "On Time" is associated is listed as having "EQP" of 777, "TAIL" of 978, "DST" of ORD, "ETD" of 10:20, and "GATE" of A7. As such, the type of aircraft is a 777, the tail number of the aircraft is 978, the destination is O'Hare International airport, the estimated time of departure is 10:20 and the aircraft is expected to push back from gate A7. This "Next Flight" is also associated with a "Readiness" selectable button and a "Message" selectable button.

Figure 8:
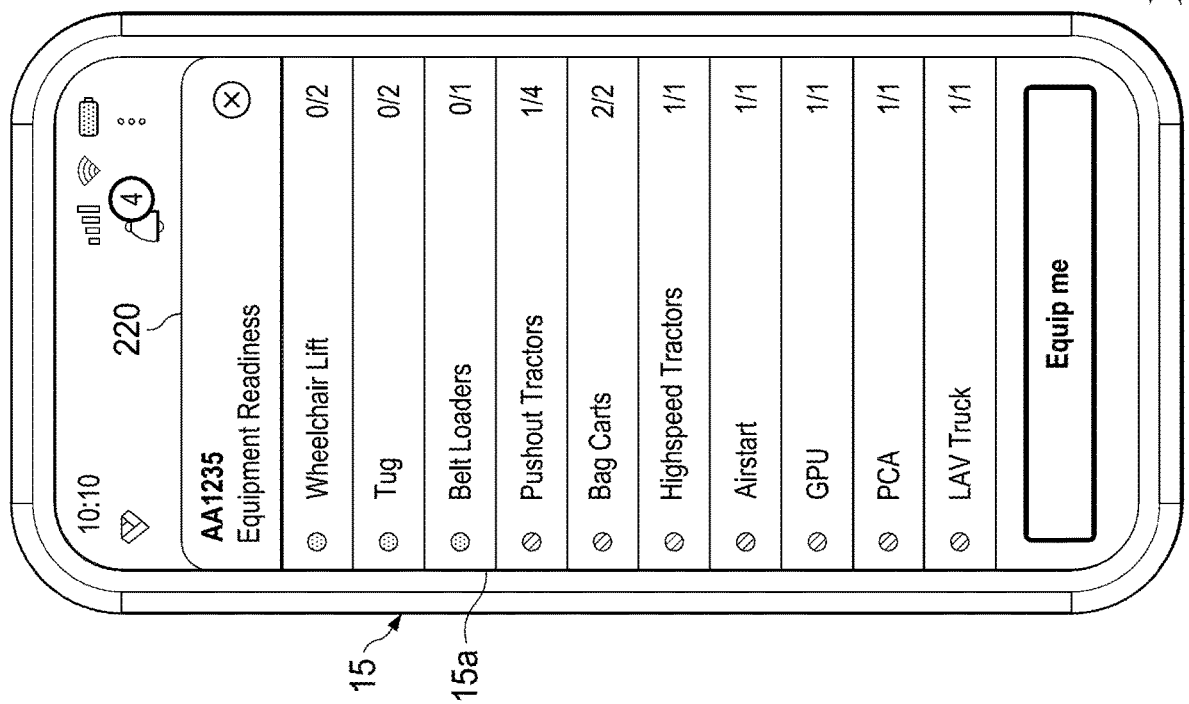

In some embodiments and when the "Readiness" selectable button for the "Current Flight" is selected, the GEM application 75 displays a window 220, as illustrated in FIG. 8, on the GUI 15a of the remote user device 15. As illustrated, the window 220 displays a listing of equipment types that includes a description or name of each equipment type, a readiness indicator for each equipment type, a number needed of each equipment type, and a number obtained for each equipment type. As illustrated in FIG. 8, two wheelchair lifts are required for the "Current Flight" AA1235, but none have been obtained and thus the readiness indicator indicates that this type of equipment is unavailable. While the readiness indicator associated with the wheelchair lift is illustrated using a first type of hatching in FIG. 8, the readiness indicator may be a color such as red, a blinking indicator, or an indicator that changes size. Similarly, two tugs are required for the "Current Flight" AA1235, but none have been obtained and thus the readiness indicator indicates that this type of equipment is unavailable. While the readiness indicator associated with the tug is illustrated using a first type of hatching in FIG. 8, the readiness indicator may be a color such as red, a blinking indicator, or an indicator that changes size. One belt loader is required for the "Current Flight" but none have been obtained and thus the readiness indicator indicates that this type of equipment is unavailable. While the readiness indicator associated with the belt loaders is illustrated using a first type of hatching in FIG. 8, the readiness indicator may be a color such as red, a blinking indicator, or an indicator that changes size. Two bag carts are needed, and two bag carts have been obtained/available, and thus the readiness indicator indicates that this type of equipment is available. While the readiness indicator associated with the bag carts is illustrated using a second type of hatching in FIG. 8, the readiness indicator may be a color such as green or a different size than the indicators associated with equipment that is unavailable. In some embodiments, the window 220 also includes a selectable button, such as the "Equip Me" button. In some embodiments, at least one of the description or name of each equipment type, the readiness indicator, the number needed, and the number obtained is selectable.

Figure 9:
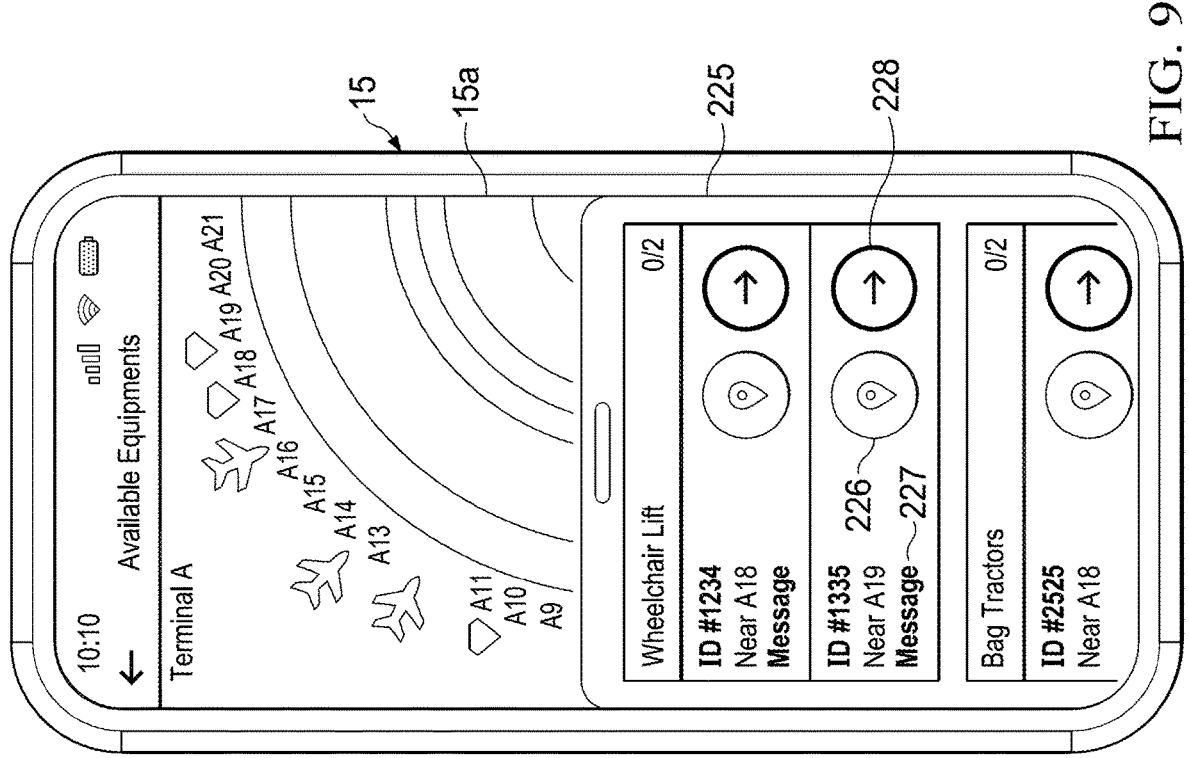
Figure 10:
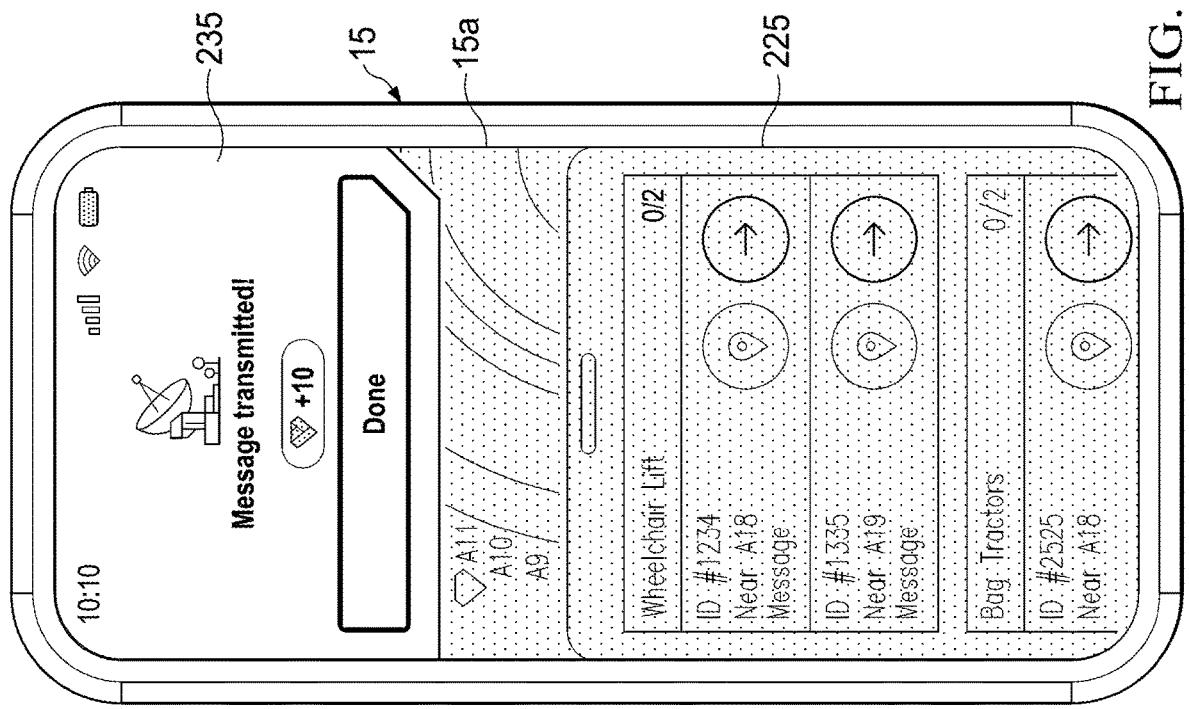

In some embodiments and at the step 140, the GEM application 75 displays the location of nearby, available ground equipment. In one embodiment, the GEM application 75 displays the window 225 as illustrated in FIG. 9 in response to the GEM application 75 receiving an indication that the "Equip Me" button has been selected. The window 225 depicts a map that includes a depiction of a terminal or portion thereof, gate identifiers, aircraft, and equipment indicators. In some embodiments, the equipment indicators include gem icons or other icons that are placed on the map to indicate the location of the equipment relative to the terminal, gates, and aircraft. In some embodiments, the window 225 also includes a text portion that lists, by equipment type, an ID number for an available piece of equipment, a location of the equipment or approximate location of the equipment, a "show on map" button 226, a message option 227, and a "check-out" button 228. Generally, the nearby, available ground equipment is limited to equipment that is available and that does not have any future commitments that would conflict with the borrowing of the equipment. That is, the GEM application 75 omits equipment from the window 225 when the equipment is currently available but predicted to be in use within 5 minutes or other period of time. In some embodiments, sensor data received from the IoT device is considered when determining whether the equipment is available. For example, if the IoT device includes pitch data and the equipment is reported as not being level or having a pitch that is typically associated with a flat tire, the equipment may not be listed as available on the window 225 or may be listed as available but with a note regarding the sensor data. When the GEM application 75 receives an indication that the user has selected the "show on map" button 226 for a piece of equipment, such as the wheelchair lift ID #1234, the equipment icon 229 is highlighted on the map as illustrated in FIG. 10. In some embodiments, the icon turns a different color, blinks, or is otherwise distinguishable from the other icons included on the map.

Figure 11:
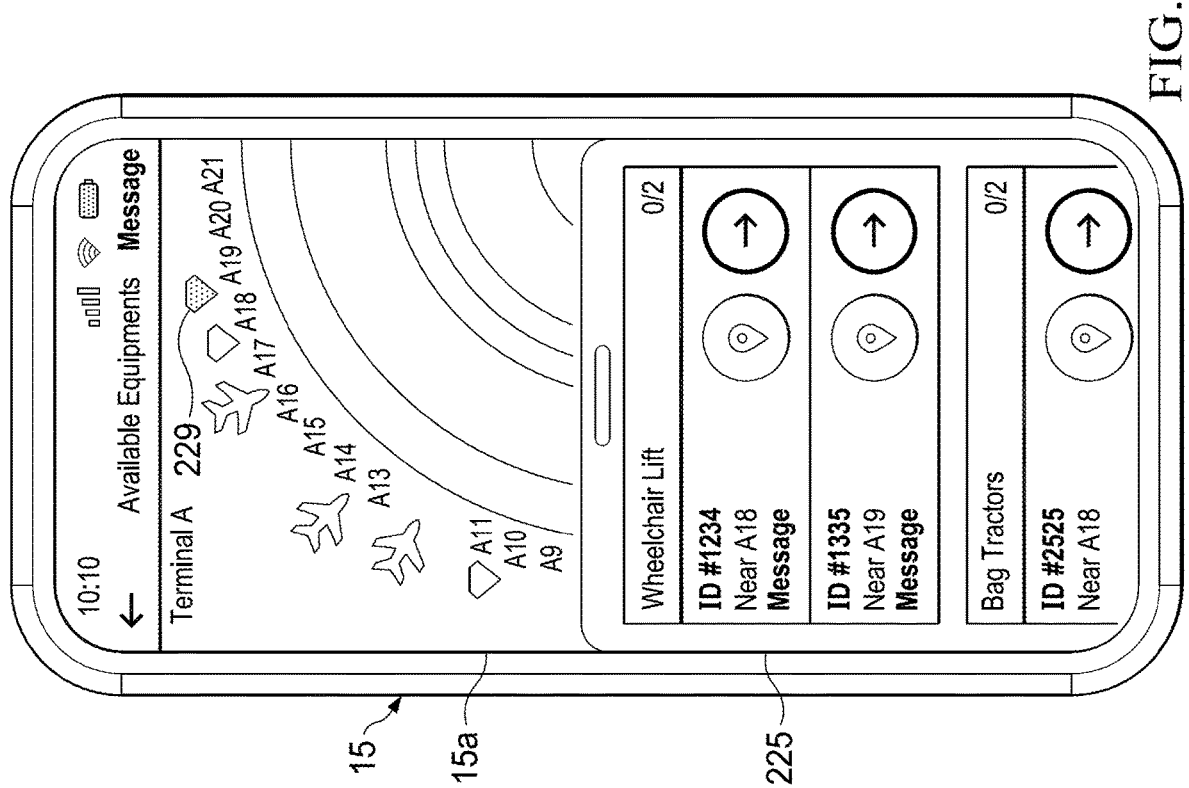
Figure 12:
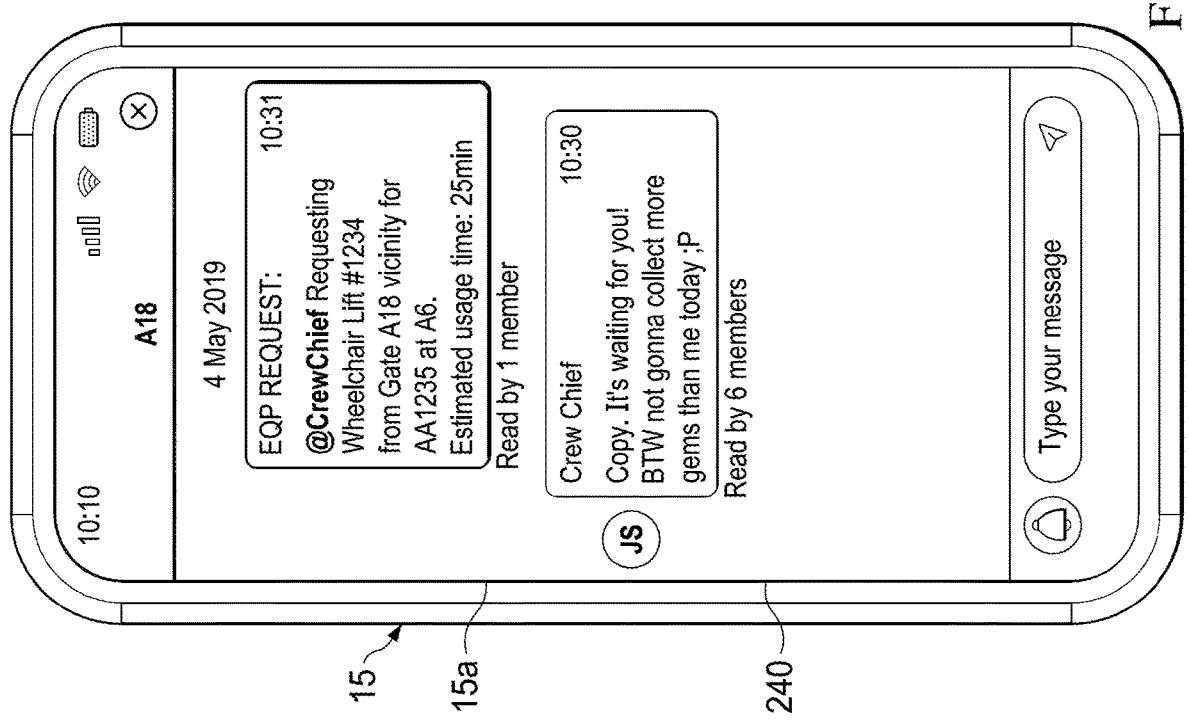

In some embodiments and at the step 145, the GEM application 75 manages and tracks the borrowing of the ground equipment. Once the GEM application 75 receives an indication that the "check-out" button has been selected for one of the pieces of equipment displayed on the window 225, the GEM application 75 displays a "message transmitted" message 235 on the window 225, as illustrated in FIG. 11. In some embodiments, users of the GEM application 75 are associated with different areas of the terminal. As such, when the needed, available wheelchair lift is indicated as being available near gate A18, another user of the GEM application 75 associated with the gate A18 may consider the needed, available wheelchair as associated with his or her area. Relaying a message to that user associated with the gate A18 indicates that the wheelchair lift is needed elsewhere and may include a request to remove the wheelchair lift from the area near gate A18. Sending a message with a request regarding the wheelchair lift enables a user that may be within visual range of the wheelchair lift to provide an update to the user that is not within visual range of the wheelchair lift regarding undocumented status (e.g., whether it is currently in use, whether there is a future planned use that conflicts with the request to borrow, etc.). In some embodiments, a request to borrow equipment is a request to change the status of the to-be-borrowed equipment from available to unavailable. In some embodiments, the GEM application 75 is integrated in, works with, or relies on a platform "ConnectMe", as described in U.S. patent application Ser. No. 15/044,891 titled "Context-Based Communication Platform" filed Feb. 16, 2016, the entire disclosure of which is hereby incorporated herein by reference. In some embodiments, the message is an automated message with information based on the data associated with the user and the information displayed on the window 225. For example, an example of the message sent is displayed in a message string via a window 240 as illustrated in FIG. 12. The message sent is "@CrewChief Requesting wheelchair Lift #1234 from Gate A18 vicinity for AA1235 at A6. Estimated usage time: 25 minutes." In some embodiments and as illustrated, the GEM application 75 estimates the amount of time the crew chief at gate A6 will need to borrow the equipment and provides that estimate to the crew chief or other user at the gate A18.

Figure 13:
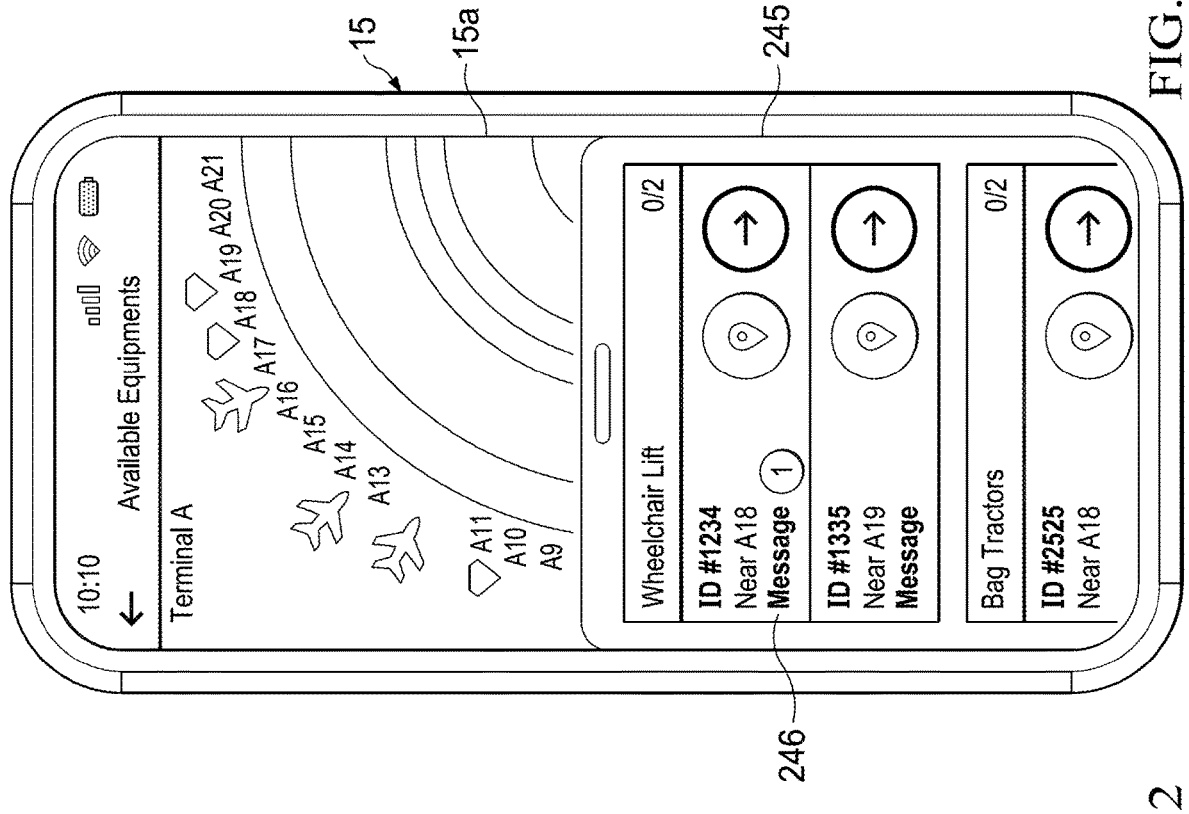

In some embodiments and as depicted in a window 245 illustrated in FIG. 13, the GEM application 75 displays an indication that a message has been received regarding the wheelchair lift with the ID number #1234 during the step 145. When the GEM application 75 receives an instruction or indication that the "message" button 246 has been selected, the GEM application 75 displays the message string, as illustrated in FIG. 12. The message from the crew chief at gate A18 is displayed and reads "Copy. It's waiting for you! BTW not gonna collect more gems than me today; P".

Figure 14:
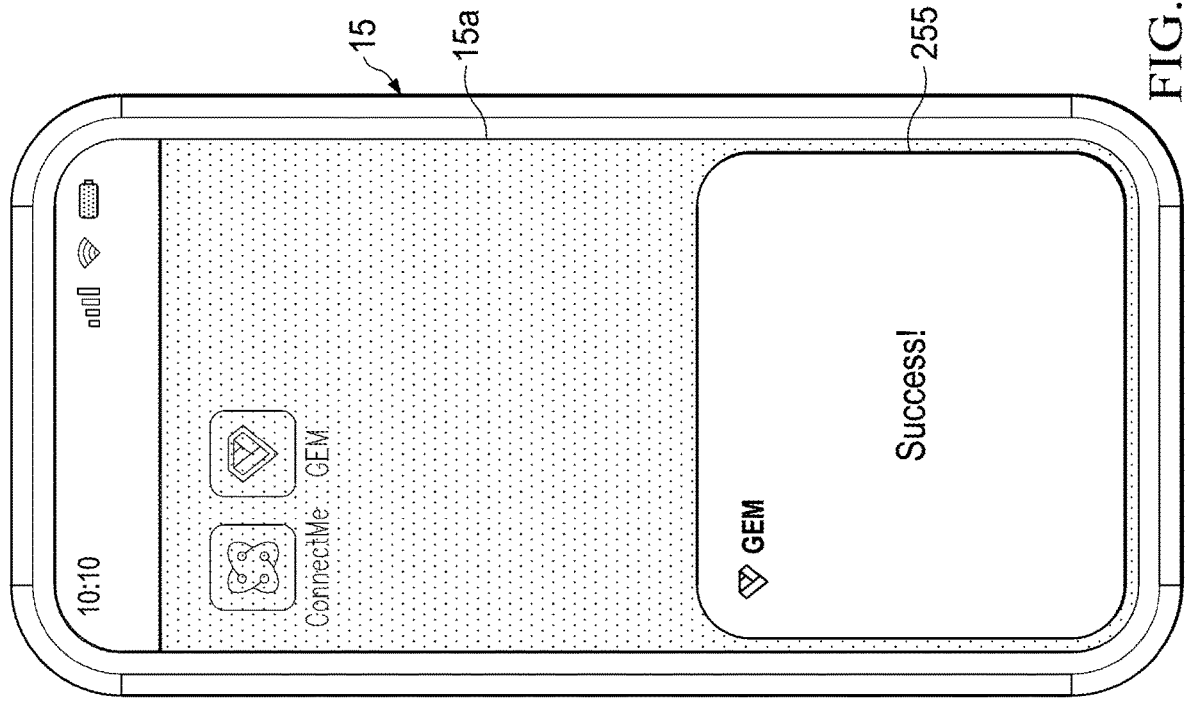
Figure 15:
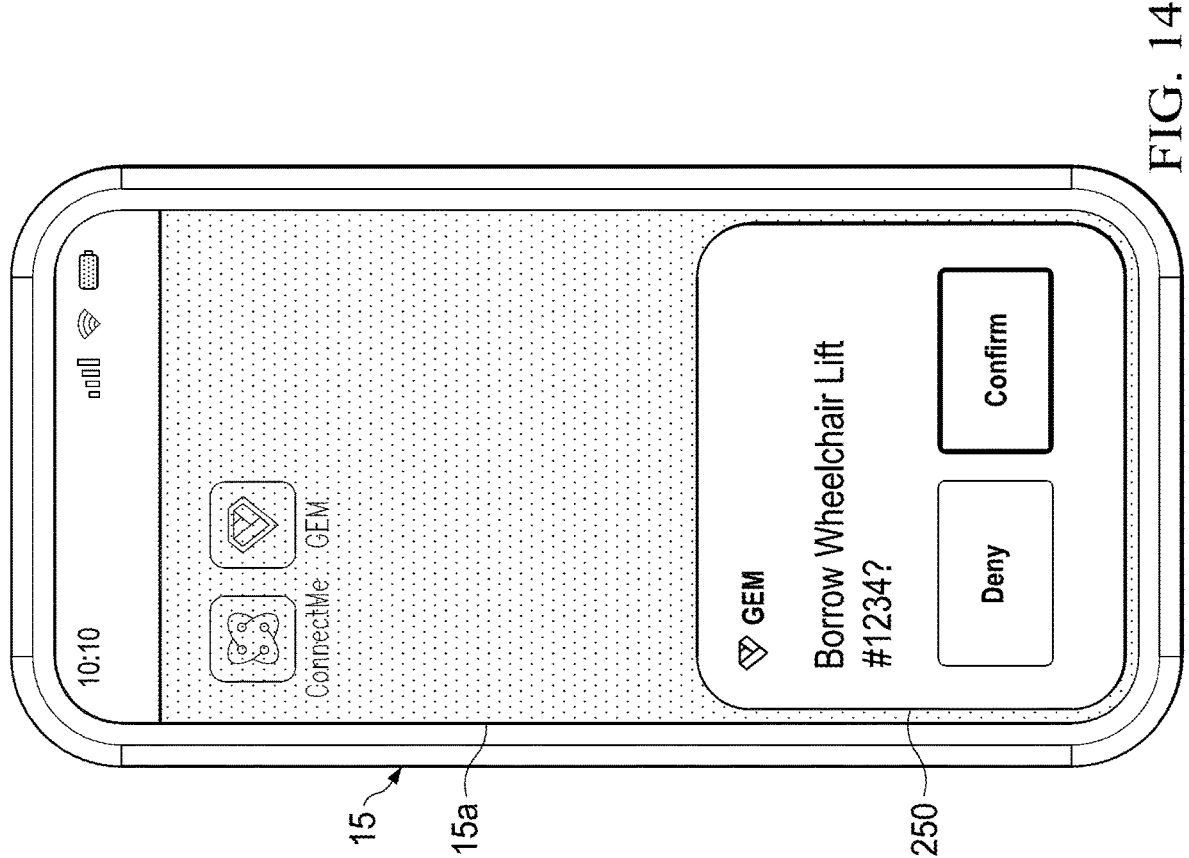

In some embodiments and during the step 145, the user of the remote user device 15 walks to obtain the wheelchair lift with the ID number #1234. When the remote user device 15 comes within a predetermined range of the IoT device associated with the wheelchair lift with the ID number #1234, the GEM application 75 displays a notification on the GUI 15a. However, in some embodiments the GEM application 75 displays the notification on the GUI 15a and/or GUI 25a. An example of the notification 250 is depicted in FIG. 14. The notification 250 may be a prompt or other message that asks the user to confirm whether the lift wheelchair #1234 is to be borrowed. As such, the notification 250 includes a selectable "deny" button and a selectable "confirm" button. Upon receiving instructions or indication that the selectable "confirm" button has been selected, the GEM application 75 displays a confirmation message 255, as illustrated in FIG. 15. In some embodiments, selecting the "confirm" button changes the status of the wheelchair from "available" to "checked-out." Moreover, the GEM application 75 tracks the location of the wheelchair #1234 via the IoT device associated with the wheelchair lift #1234 and the gateways 55 but also due to the confirmation of the borrowing via the remote user device 15 and/or device 25.

Figure 16:
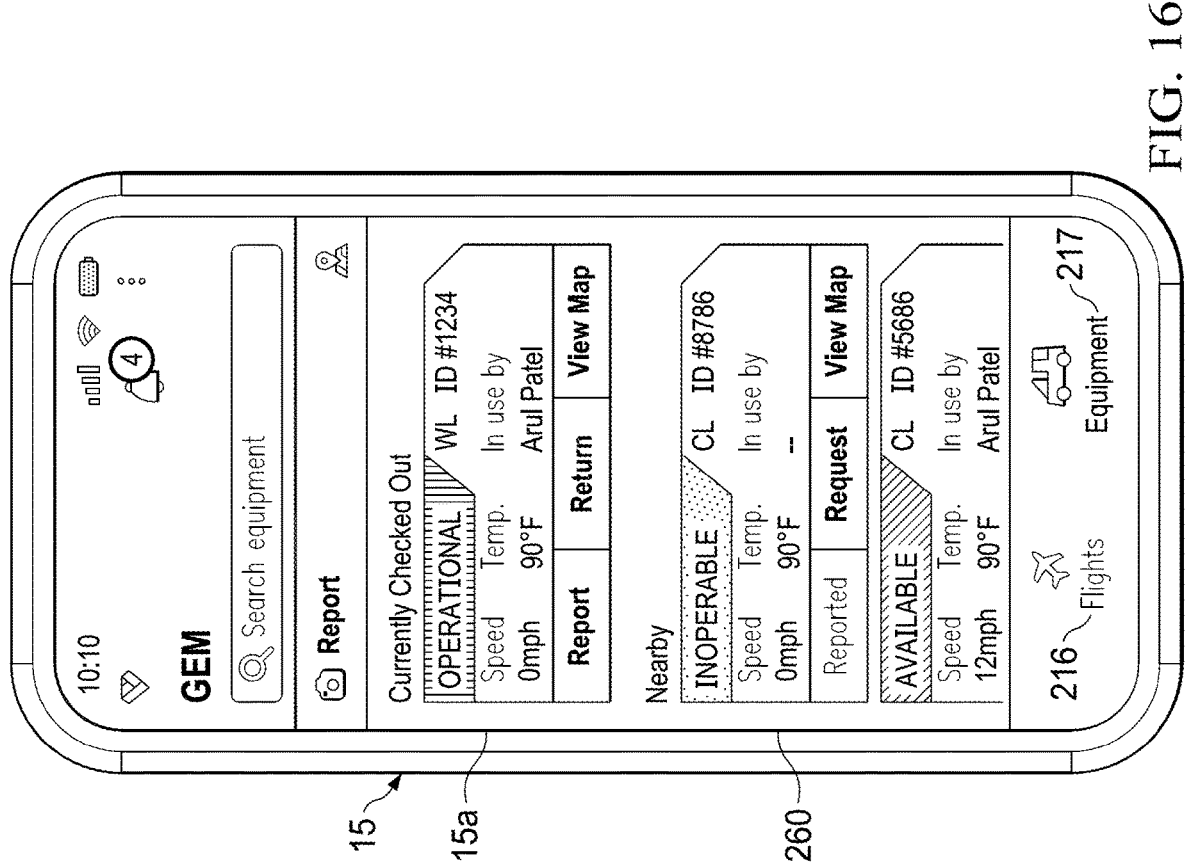

In some embodiments and referring back to FIG. 7, when the "equipment" button 217 illustrated is selected, the GEM application 75 displays an equipment report. An example of an equipment report is as illustrated in FIG. 16 in window 260. In some embodiments, the equipment report includes "Currently Checked Out" equipment with the equipment type, status (e.g., operational, inoperable, available, etc.), identification number, speed, temperature, the operator using the equipment, a selectable "report" button, a selectable "return" button, and a selectable "view map" button for the piece of equipment. In some embodiments, the equipment report includes "nearby" equipment, with the equipment type, status (e.g., operational, inoperable, available, etc.), identification number, speed, temperature, the operator using the equipment, a selectable "report" button, a selectable "Request" button, and a selectable "view map" button for the piece of equipment. In some embodiments, and when the GEM application 75 receives an indication that the "return" button has been selected for a piece of equipment that is "Currently Checked Out," the GEM application 75 notes that the equipment associated with that return button has been returned to its original location or is otherwise not in use and classified as "available." In some embodiments, and when the GEM application 75 receives an indication that the "request" button has been selected for a piece of equipment that is "Nearby," the GEM application 75 begins the process of checking the equipment out to the user, which may include sending a message as described above.

Figure 17:
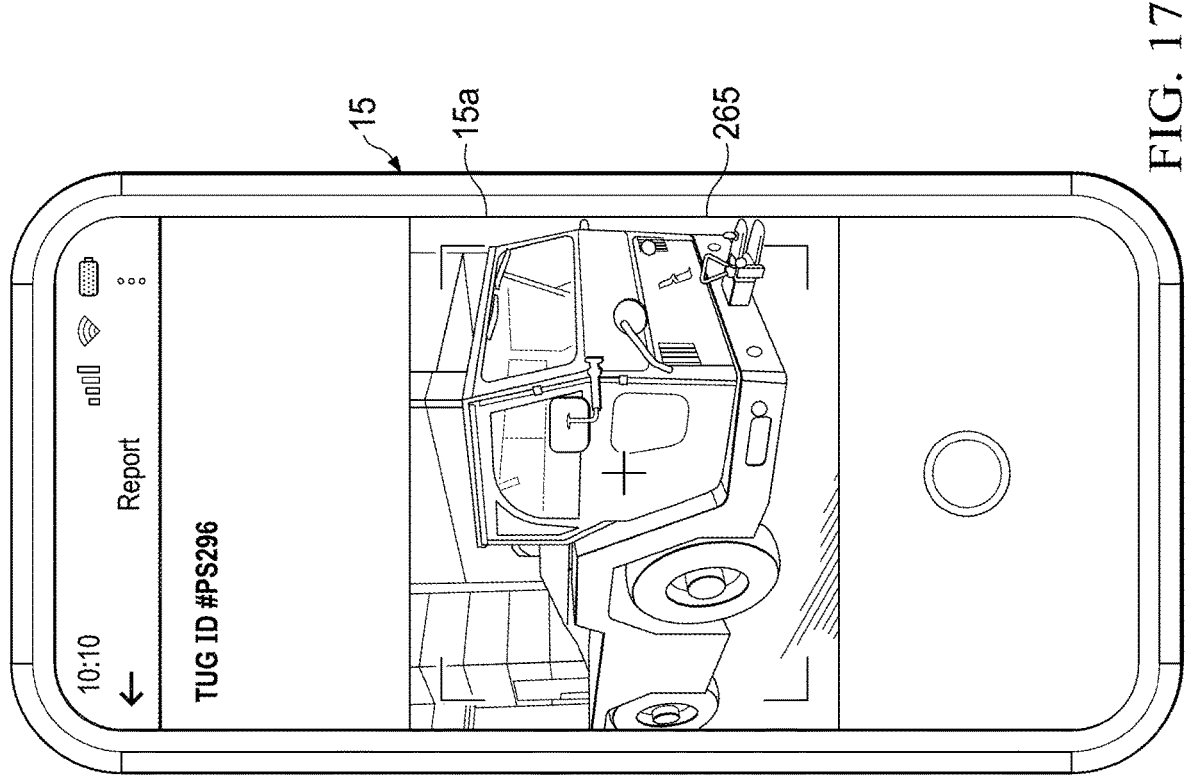
Figure 19:
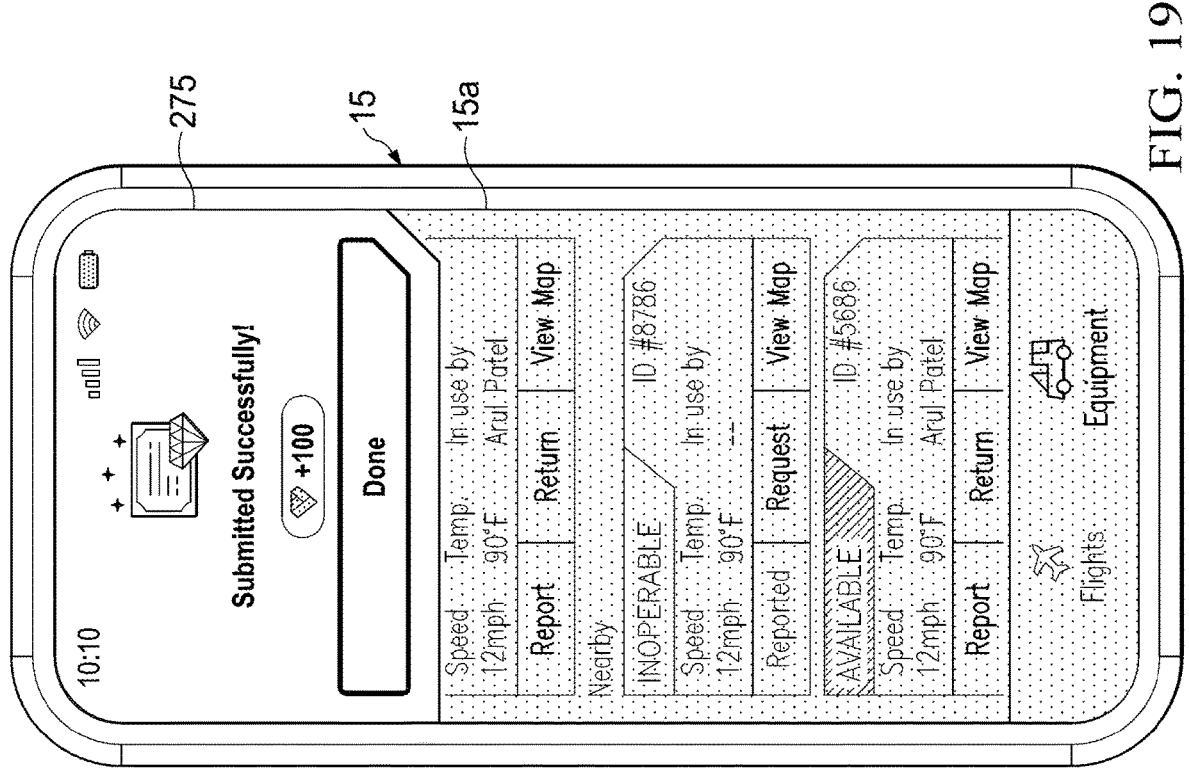
Figure 18:
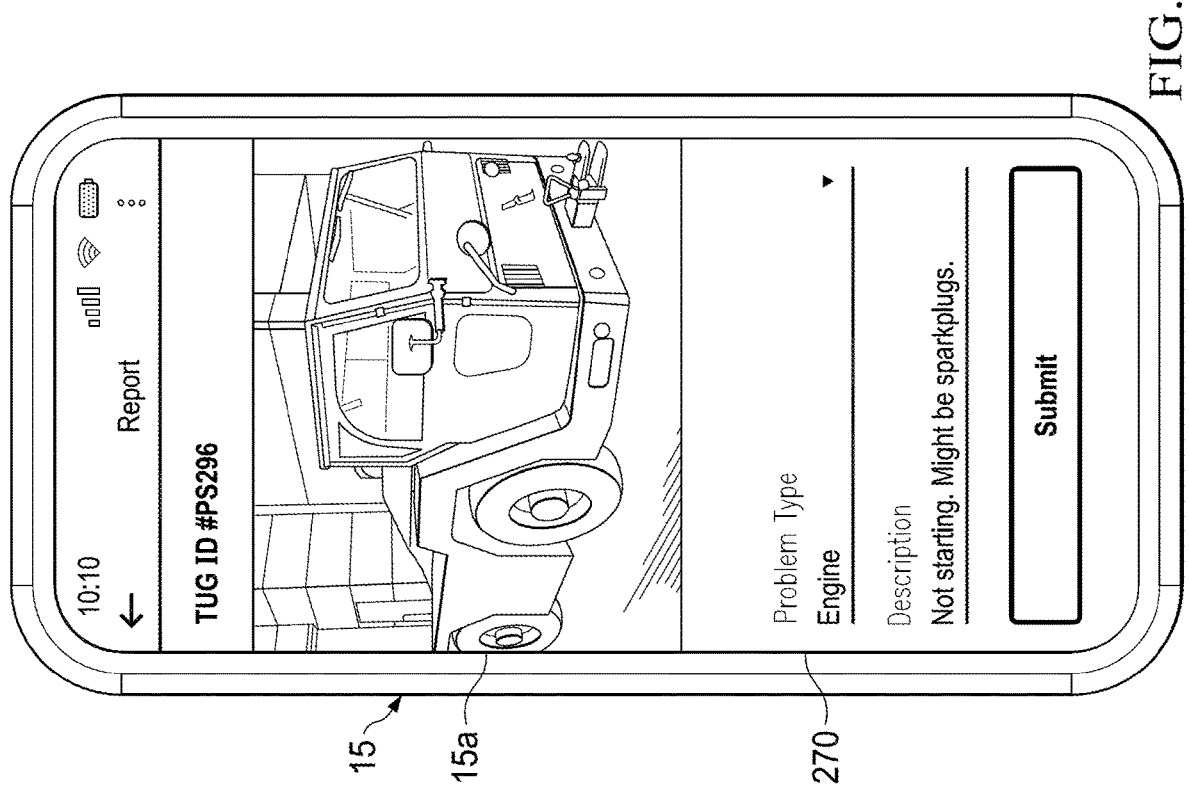

In some embodiments, the window 260 also includes a "report" selectable button and a "View Map" selectable button. In some embodiments, and when the GEM application 75 receives an indication that the selectable "report" button has been selected, the GEM application 75 creates a report and displays a window 265 on the GUI 15a, as illustrated in FIG. 17. In some embodiments, the selection of the "report" button activates the camera 15g. That is, the GEM application 75 initiates activation of the camera 15g or otherwise accesses the camera 15g of the remote user device 15. The user positions the remote user device 15 relative to a piece of ground equipment such that the ground equipment is within the scope of the camera 15g. In some embodiments, the GEM application 75 detects the piece of equipment via the IoT device (e.g., proximity sensor or other) associated with the piece of equipment and identifies the piece of equipment that is within the scope of the camera 15g. Once the photograph has been taken using the camera 15g, the photograph is displayed on a window of the GUI 15a. An example of a window 270 that displays the photograph is illustrated in FIG. 18. In some embodiments, the window 270 includes the image of the photograph and data entry elements and prompts that are configured to solicit and receive a problem type associated with the report and a description of the problem reported. Moreover, the window 270 includes a selectable "submit" button. Generally, the GEM application 75 identifies the piece of equipment and prepopulates/auto-populates the window 270 with the equipment identification number based on the detection of the IoT device. Upon the GEM application 75 receiving an indication that the submit button has been selected, a window 275, as illustrated in FIG. 19, is displayed on the GUI 15a. The window 275 includes an indication that the equipment report was successfully created and submitted and notes that the user gained 100 gems. In some embodiments, the submitted equipment report includes the photograph or image of the equipment, with the image of the equipment never being saved in a camera roll or album within the remote user device 15. At the time of capturing or creating images, the GEM application 75 creates metadata for the image. In some embodiments, the equipment report includes metadata and an image file, which is associated with the photograph or image. The metadata includes data relating to equipment number, a date, a location, problem type data, description data, an identifier of the user associated with the remote user device 15, and in some embodiments GPS coordinates obtained from the remote user device 15. The metadata relating to the time and/or date may include the time and/or date on which the camera 15g created the photo. The metadata relating to the identifier of the user associated with the remote user device 15 may include an employee number, an employee name, or another type of identifier that identifies the user of the GEM application 75. The metadata relating to the GPS coordinates may include GPS coordinates of the remote user device 15 at the time or before the camera 15g created the photo. Generally, the GPS coordinates are created or provided by a navigation receiver of the remote user device 15 and is in communication with a satellite navigation system via the network 40. In some embodiments, the created and submitted equipment report is submitted via the GEM application 75 to automatically create a work order relating to the repair of the equipment. In some embodiments, the GEM application 75 automatically deletes the photo file from the remote user device 15. That is, the photo file is not stored in the memory of the remote user device 15. In some embodiments, the deletion of the photo file is in response to the sending or pushing of the photo file from the remote user device 15 and to the computer 35. In some embodiments, the metadata is formatted and configured such that the data and fields are compatible with an application that manages and tracks maintenance requests, events, and performance of the equipment. In some embodiments, the GEM application 75 includes, is based on, and/or incorporates FlightHub or the method of handling messages described in U.S. patent application Ser. No. 11/119,787 filed May 2, 2005 and titled "System and Method for Managing Multiple Message Format Communication," the entire disclosure of which is hereby incorporated herein by reference. In some embodiments, the interaction between the GEM application 75 and the maintenance application is based on and/or incorporates FlightHub. In some embodiments, an equipment report is automatically generated by the GEM application 75 based on the GE data supplied by the IoT device. For example, and when the IoT device includes a sensor level and when the data indicates that the equipment is not level or may indicate that one tire is not sufficiently inflated, an equipment report is automatically generated using the GE data and sent to the application managing and tracking maintenance reports. In some embodiments and when an equipment report has been submitted regarding a piece of ground equipment, the GEM application 75 no longer classifies the ground equipment as having an available status until after the maintenance request has been addressed or otherwise cleared. Generally, an equipment report or other report documents the status of the piece of equipment. In some embodiments, the report comprises data fields. For example, one data field may receive an image of the piece of equipment or a portion of the piece of equipment. The data field receiving the image may receive or be defined by a JPEG, TIFF, PNG, EPS, RAW, etc. format. Another example data field is a field that is associated with a location of the piece of equipment and the data field may be formatting to receive GPS coordinates or data relating to Assisted GPS. In some embodiments, the data field receives an equipment identifier. The equipment identifier may be in text or another format. In some embodiments, the data field receives an equipment classification, for example, the equipment classification is a wheelchair lift, a tug, a belt loader, a pushout tractor, a bag cart, a highspeed tractor, or an Air Start Unit and the format of that data field is text or another format. In some embodiments, the format of the data fields of the equipment report coincides with a format of data fields for a maintenance report such that the data can be transferred easily without reformatting of the data when creating a maintenance report.

Figure 21:
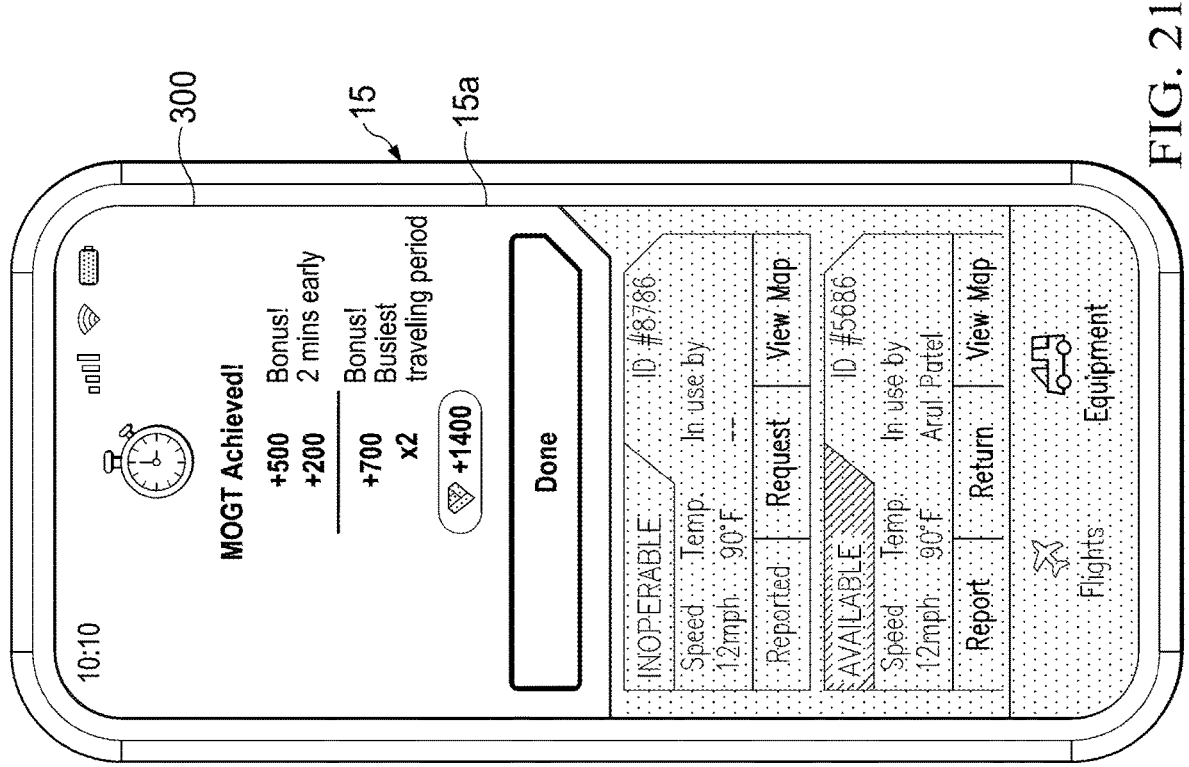
Figure 20:
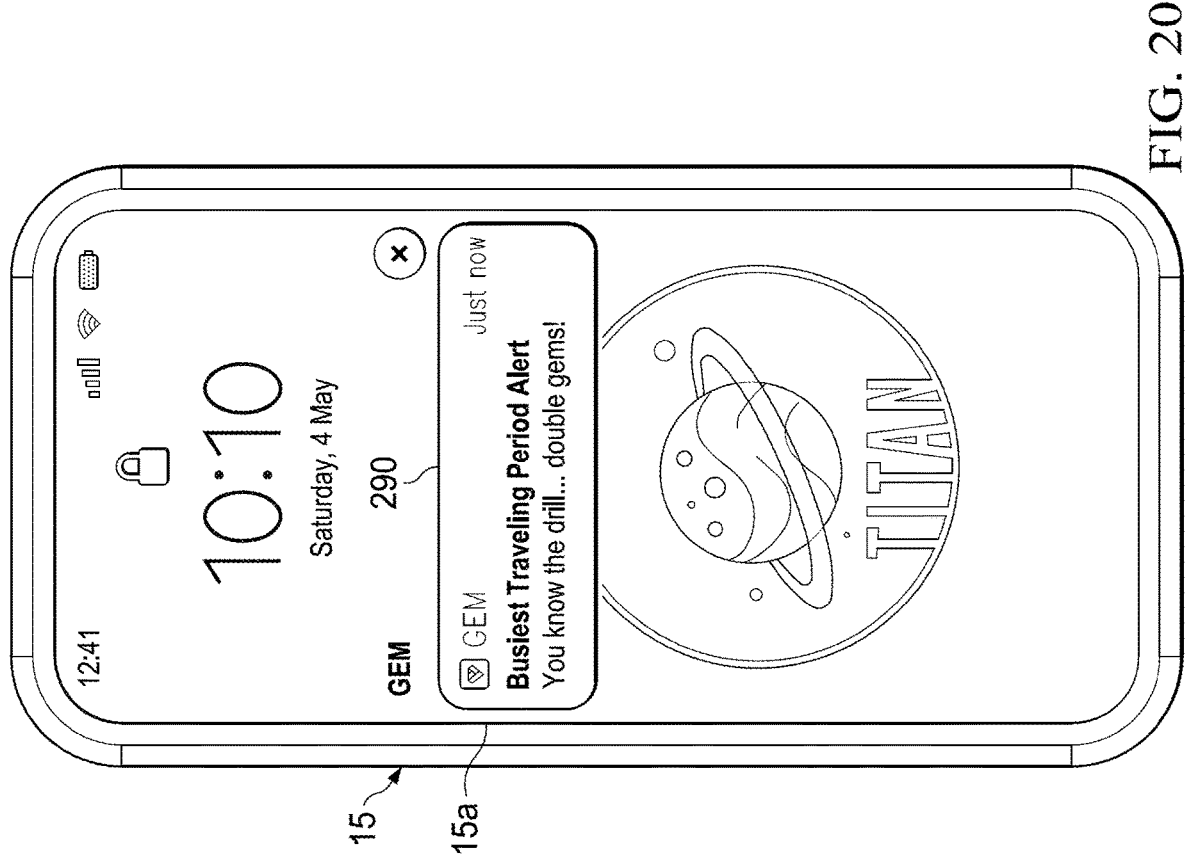
Figure 22:
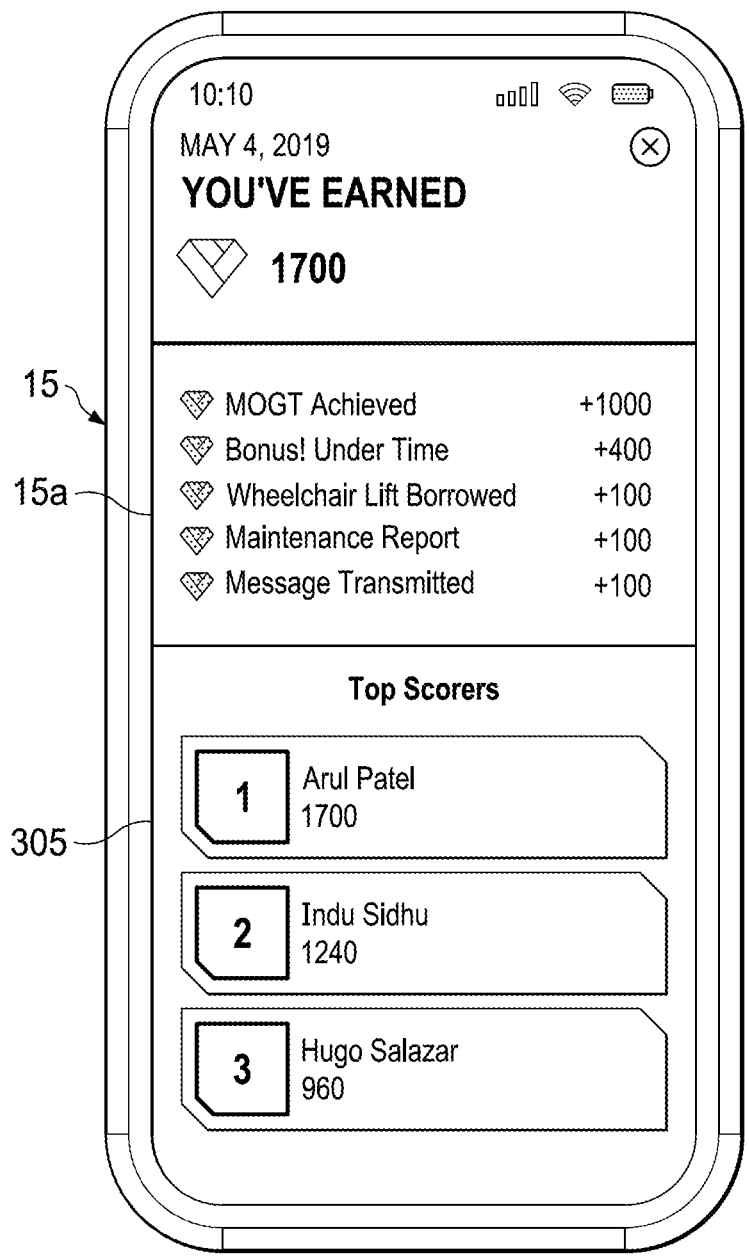

In some embodiments, the GEM application 75 gamifies the process of tracking, managing, and monitoring the ground equipment. In one embodiment, one of the plurality of data sources is a data source that predicts and monitors the busiest travel days that occur within a year. On such days, the rewards are increased, and notice is provided to the users that the 1) rewards are increased and 2) that day or an upcoming day is expected to be a busy traveling period. One example of a notice provided by the GEM application 75 is illustrated as a notice 290 in FIG. 20. In some embodiments, rewards are provided when the actual turn time is equal to or less than the predicted turn time. An example of a notice provided regarding the actual turn time being equal to or less than the predicted turn time is illustrated as a notice 300 of FIG. 21. A summary of rewards and top scorers is displayed on a window 305 as illustrated in FIG. 22.

In some embodiments, the system 10 is an inventory or location monitoring system for the ground equipment and tracks the ground equipment as it is borrowed/checked-out and returned/check-in to different users and/or locations in an airport. The system 10 is a geolocation inventory system that is augmented with a self-reporting system based on user feedback to track, monitor, manage, and report equipment location, status, and repair issues.

In some embodiments, the GEM application 75 cross-checks the reported equipment report with the GE data sent from the IoT device associated with the reported equipment. For example, if a user indicates that the equipment is not functioning and thus is listed as not available for future borrowing, but the IoT device indicates that the equipment is being driven or otherwise moving within the terminal, then the GEM application 75 may request the user or another user to validate the reported equipment report and/or status of the equipment.

In some embodiments, the GEM application 75 prioritizes equipment reports that are associated with equipment in high demand. For example, if the equipment is the only of its type and must be used multiple times each day, then the GEM application 75 designates the equipment report as critical or high importance. However, if the equipment has replacements or is not expected to be used for a certain period of time, the GEM application 75 does not designate the equipment report as critical or high importance.

In some embodiments, the GEM application 75 reduces flight delays and reduces passenger wait times for boarding and deplaning by enabling the appropriate equipment to be present at the relevant gate during turning of the aircraft. As such, the GEM application 75 increases customer satisfaction.

In some embodiments, when a first IoT device includes a visual indicator and when the user of the remote user device has requested to check out the ground equipment associated with the first IoT device, the first IoT device activates its visual indicator when the remote user device is within a predetermined distance. For example, when the user indicates that he or she wants to check out the wheelchair lift ID #1234 and then walks toward the area in which the wheelchair lift ID #1234 is located, the IoT device associated with the wheelchair lift ID #1234 is activated upon the remote user device coming within proximity of the IoT device to alert the user that the wheelchair with the activated visual indicator is the wheelchair lift ID #1234. Other types of visual or audio indicators may be used, such as for example a beeping noise, a flashing light, etc. In some embodiments, coming within proximity includes coming within range of the beacon and can change depending on the type of beacon.

In some embodiments, the GEM application 75 calculates the time required to travel from the location of the remote user device 15 to the location of the available equipment and displays the estimated procurement time associated with each available equipment. In some embodiments and upon calculating the estimated procurement time for the user of the remote user device 15 to obtain the equipment, the GEM application 75 may suggest another user procure the equipment to improve the actual turn time.

In some embodiments, the GEM application 75 causes a signal to be sent to the equipment instructing the equipment to move itself to the location at which it is needed. For example, if the equipment is a motorized, drivable tug and the tug is equipped with self-driving or autonomous technology, then the GEM application 75 can instruct and/or control the movement of the tug so that the tug drives itself to the needed location. In some embodiments, the GEM application 75 provides the location to the tug with instructions indicating when the tug is needed, and the tug drives itself to the location prior to the time at which it is needed. In some embodiments, the GEM application 75 sends a signal to an autonomous vehicle that is capable of loading, moving, and unloading equipment to the location. Similar to the autonomous tug, the autonomous vehicle is sent instructions regarding the location of the available equipment, the time required to transport the equipment, and the final destination of the equipment. The autonomous vehicle then picks up the equipment and moves it to the new location. In some embodiments, the GEM application 75 tracks the movement of the equipment when the equipment is autonomous or being moved via an autonomous vehicle in a manner similar to the manner when a user transports the equipment.

In some embodiments, the GEM application 75 tracks the locations at which equipment will be needed through a day, shift, or other period of time. The GEM application 75 can route a path for the equipment so that each gate or area that needs the equipment is notified of its path throughout the day. For example, a piece of equipment may not be checked-out to gate A6, but the GEM application 75 provides a note to the user that the piece of equipment at gate A4 is reserved for use by the gate A6 at a certain time and then the piece of equipment will be sent to gate A9 for a period of time after it is needed at gate A6. This allows for one piece of equipment to be used in an efficient manner. In some embodiments, the GEM application 75 tracks the use of the equipment over time, the demand of the equipment over time, maintenance issues relating to the equipment over time, and recommends procurement of additional pieces of equipment or retirement of specific pieces of equipment. In some embodiments, the system 10 employs, works with, includes, or otherwise is associated with machine learning, artificial intelligence, neural networks, and the like to predict the flow and need of the ground equipment.

In some embodiments, the system 10 uses the history, schedule, and predicted use of the ground equipment to plan gate assignments for aircraft in the terminal and/or to plan flight schedules to optimize the use of the ground equipment. For example, if there is only one tug and the tug is needed for five turns during the day, the inbound or outbound flights associated with the turns can be scheduled such that the tug is not needed by two turns at one time and the times needed for the tug are spaced throughout the day.

In some embodiments, one of the plurality of data sources includes a flight operation system, and the past, current, and predicted or scheduled use of the ground equipment is considered to refine the predicted turn time.

In some embodiments, the system 10 allows crew managers to communicate, request, and compete with each other to reduce or eliminate flight delays.

In some embodiments, the system 10 provides a mobile solution for crew chiefs, which are often the users of the remote user devices, by leveraging IoT device technology and related platforms. In some embodiments, the ground equipment items are enabled with geo location Bluetooth beacons. In some embodiments, the plurality of gateways 55, which is an IoT device receiver, detects the location of Bluetooth devices and pushes the location to the cloud (IoT). In some embodiments, the GEM application 75 uses the IoT (Beacon location) data along with flight info feed from flight hub to: cross-verify the equipment required for each fleet type (Narrow Body and Wide Body), calculate if the right equipment is present at the right gate; and alert the crew chief as needed. In some embodiments, the remote user device 25 is a smart watch and the GEM application 75 sends a custom notification to the smart watch of the crew chief as the equipment moves or arrives.

In some embodiments, the system 10 provides real time, full inventory, gate and ground equipment management; enables communication between gates and ground crew managers; and/or provides countdown to departure times, which allows for improved out/off/on/in ("OOOI") events and compliance with predicted turn times.

In some embodiments, the system 10 includes the ability to: show weather data via a window displayed on the GUI 15a or the GUI 25a; use the crew chief preparedness data for performance review; display procure time (e.g., time predicted to walk and retrieve equipment or arrange someone to drop the item off) on the GUI 15a and/or the GUI 25a; view airport-wide or terminal-wide availability of common equipment via the GUI 15a and/or the GUI 25a; send reminders to return borrowed equipment or obtain equipment borrowed from the user via the GUI 15a and/or the GUI 25a; display scheduled preventative maintenance via the GUI 15a and/or the GUI 25a; and incorporate machine learning to predict equipment movement and usage.

The system 10 is not limited to airlines and can be used by a variety of industries to track different types of equipment. For example, the equipment may include powered and moveable equipment in maintenance base and stores; bikes and golf carts located on a campus; wheelchairs that are available upon special request; and other portable electronic devices such as ramp link devices.

In some embodiments and using the system 10, the automated collection and storage of the photo file to the "cloud" or the computer 35 (directly from the remote user device 15 via the GEM application 75) avoids the storage of the photo file in the remote user device 15, thereby improving the functioning of the remote user device 15 by increasing the unused memory available in the remote user device 15. Moreover, the automated collection and storage of the photo file to the "cloud" or the computer 35 avoids the need to email the photo file and associated storage of the email and photo file in database 15d, thereby improving the functioning of the database 15d and remote user device 15 by increasing the unused memory available in the database 15d and the remote user device 15. Increasing the unused or available memory of the remote user device 15 makes the remote user device 15 operate more efficiently, and the processing speed of the remote user device 15 is increased. Thus, the GEM application 75 improves the functioning of the remote user device 15 itself. That is, the system 10 results in specific improvements in computer capabilities (i.e., reduction of required memory). Additionally, the system 10 may include a set of rules that requires the photo file that is created and stored using the system 10 to have storage requirements of less than a predetermined number file size to further reduce the usage of memory within the remote user device 15.

In an example embodiment of the system 10, when a photo file is created using the remote user device 15, the photo file is not stored in the memory of the remote user device 15, as the photo file is automatically uploaded to the computer 35 or the "cloud" (e.g., the third-party storage) directly or via the GEM application 75. Thus, the system 10 improves the functioning of the remote user device 15 itself because the photo file is not stored in the memory of the remote user device 15.

In several example embodiments, the system 10 and/or the execution of at least a portion of the method 100 reduces error rates by prepopulating GE data to an equipment report.

In several example embodiments, the system 10 and/or the execution of at least a portion of the method 100 monitors the turn times and estimated actual turn times for each aircraft and sends alerts to employees and other down-line systems when the actual turn time is, or is expected to be, greater than the predicted turn time.

In several example embodiments, the operation of the system 10 results in alarms, messages, data streams, etc., which update critical operational departments, such as the tower and the control center, when the system 10 determines that the actual turn time will be greater than the predicted turn time. Other mitigating actions may be implemented to prevent a flight delay from propagating through the airline.

In several example embodiments, the system 10 employs neural networks and/or deep learning to, for example, train models that predict the movement, availability, and schedule of the ground equipment items.

In some embodiments and using the system 10, conventional equipment maintenance reports are no longer needed or the need is significantly reduced, which eliminates the need for the dispatch, receipt, and storage of any conventional equipment maintenance reports by the system 10. As noted, the system 10 automatically prepopulates or uses the GE data that is embedded in the file photo or equipment report generated by the GEM application 75 to create maintenance tickets or other types of maintenance action-items within the application directed to managing maintenance tickets. The required amount of computer processing and computer memory required by the computer 35 is reduced as the computer 35 is not required to receive, store, decipher, and otherwise transfer conventional maintenance requests or report applications outside of the GEM application 75. As such, the technical field of maintenance reporting and tracking is improved.

In several exemplary embodiments, the system 10 includes an arrangement of elements (i.e., the GEM application 75, the remote user device 15, the IoT devices 45, and the gateways 55) that is a technical improvement over the previous ways of reporting maintenance issues and generating maintenance tickets. The system 10 is a technical solution to problems associated with the reporting of maintenance issues using applications that are different from the maintenance application. Moreover, the GEM application 75 enforces a layer of input validation (e.g., use of metadata to create maintenance tickets) and controls to result in faster and more efficient data entry into the maintenance application. In an exemplary embodiment, the GEM application 75 joins the maintenance system (i.e., the application that manages the maintenance reporting, tracking, etc.) with a user-friendly interface and sensor detection (via the IoT devices) to increase the accuracy of maintenance tickets and reduce the processing load and memory associated with each application.

The system 10 and/or the method 100 involve a practical application of monitoring ground equipment items and providing alerts to relevant parties. Moreover, the system 10 and/or the method 100 are an improvement to the technical field of ground equipment and gate turnaround management.

In an example embodiment, a child window of the GEM application 75 (e.g., window 215) is displayed on the GUI 15a after a user navigates through a parent window of the GEM application 75 (e.g., windows 200 and 205). Thus, the parent window is generally displayed prior to the display of its child window. As described, the GEM application 75 displays, in response to the selection of a push notification, such as the push notification 210, one of the child windows, such as for example the window 215, as the home window when opening the GEM application 75, or at least displays one of the child windows by bypassing a parent window of the child window. That is, the selection of the selectable window 215 bypasses the display of one or more parent windows to directly open or display a child window. Switching between different windows requires loading of the different windows to display on the remote user device 15. This, in turn, increases the processing load (of the processor 15b) on the remote user device 15. Bypassing a parent window reduces the number of windows displayed on the GUI 15a of the remote user device 15. Reducing the number of windows displayed on the GUI 15a, using the system 10 and/or the method 100, thereby reduces the processing load on the remote user device 15. Reducing the processing load of the processor 15b improves the performance of the remote user device 15 such that available memory of the remote user device 15 is increased, the processing capacity of the remote user device 15 is increased, and the processing speed of the remote user device 15 is increased.

Moreover, the GEM application 75 automatically provides an update to the downstream applications in a compatible format. In several example embodiments, execution of one or more steps of the method 100 enables a manager (or other personnel) to avoid manually updating multiple downstream applications. Instead, in several example embodiments, execution of one or more steps of the method 100 results in the continuous and automatic update of all of the airline flight schedules, gate schedules, and crew schedules, and the automatic and immediate capture or identification of problem gate turnarounds. As such, the displays on the GUI 15a and/or the GEM application 75 improves the functioning of the computer 35, the remote user device 15 and the remote user device 25.

In some embodiments, a user logging into the GEM application 75 automatically logs the user into other applications, such as the ConnectMe application. That is, the requirement for displaying a user login window and sub windows for the ConnectMe using the GUI 15a is eliminated and inputting login information and searching commands is also eliminated. As such, the processing load on the remote user device 15 is reduced compared to the remote user device 15 needing to display login window(s) and receive login information and searching commands. Reducing the processing load of the remote user device 15 generally improves the performance of the remote user device 15 such that the available memory of the remote user device 15 is increased, the processing capacity of the remote user device 15 is increased, therefore making the remote user device 15 operate more efficiently, and the processing speed of the remote user device 15 is increased. Thus, the GEM application 75 improves the functioning of the remote user device 15 itself. That is, the system 10 results in specific improvements in computer capabilities (i.e., reduction of required memory and reduction of processing load).

In some embodiments, data entry elements include text boxes, toggle buttons, drop-down menus, etc.

Figure 23:
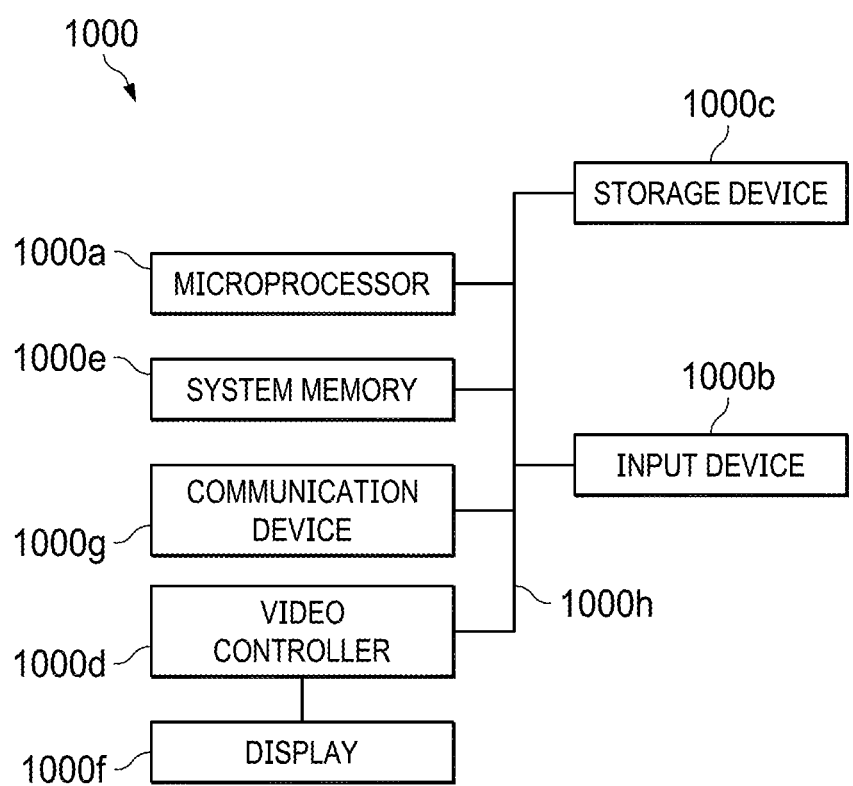
FIG. 23 is a diagrammatic illustration of a computing device, or node, for implementing one or more example embodiments of the present disclosure, according to an example embodiment.

In an example embodiment, as illustrated in FIG. 23 with continuing reference to FIGS. 1-22, an illustrative node 1000 for implementing one or more of the example embodiments described above and/or illustrated in FIGS. 1-22 is depicted. The node 1000 includes a microprocessor 1000a, an input device 1000b, a storage device 1000c, a video controller 1000d, a system memory 1000e, a display 1000f, and a communication device 1000g, all interconnected by one or more buses 1000h. In several example embodiments, the storage device 1000c may include a floppy drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAS, smartphones, and cell phones.

In several example embodiments, one or more of the components of the systems described above and/or illustrated in FIGS. 1-22 include at least the node 1000 and/or components thereof, and/or one or more nodes that are substantially similar to the node 1000 and/or components thereof. In several example embodiments, one or more of the above-described components of the node 1000, the system 10, and/or the example embodiments described above and/or illustrated in FIGS. 1-22 include respective pluralities of same components.

In several example embodiments, one or more of the applications, systems, and application programs described above and/or illustrated in FIGS. 1-22 include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices, and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions is stored on a non-transitory computer readable medium and are executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000*a*, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

It is understood that variations may be made in the foregoing without departing from the scope of the present disclosure. For example, instead of, or in addition to, transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries.

The present disclosure introduces a system comprising: mobile ground equipment; a beacon coupled to each mobile ground equipment item and configured to transmit ground equipment data relating to the ground equipment item to which it is coupled; gateways in communication with one or more of the beacon(s); and a non-transitory computer readable medium having stored thereon a plurality of instructions, wherein the instructions are executed with at least one processor so that the following steps are executed: receiving ground equipment data from the beacons via the gateways; identifying, based on the ground equipment data for each mobile ground equipment item, a status and/or a location of each mobile ground equipment item; identifying an equipment list for a turnaround of an aircraft at a first location, wherein the equipment list comprises a type of needed mobile ground equipment; and determining, based on the status and/or the location of each mobile ground equipment item, if the type of needed mobile ground equipment is available or unavailable at the first location. In some embodiments, the instructions are executed with the at least one processor so that the following steps are also executed: identifying, when it has been determined that the type of needed mobile ground equipment is unavailable at the first location, a mobile ground equipment item that is available at a second location; wherein the mobile ground equipment item that is available at the second location is nearby available equipment; and identifying the second location of the nearby available equipment. In some embodiments, the instructions are executed with the at least one processor so that the following step is also executed: displaying, on a graphical user interface ("GUI") of a first remote user device, information relating to the second location of the nearby available equipment. In some embodiments, identifying the equipment list for the turnaround of the aircraft at the first location comprises identifying a first target turn time associated with the turnaround, wherein the first target turn time is a period of time; and wherein determining, based on the status and/or the location of each mobile ground equipment item, if the type of needed mobile ground equipment is available or unavailable at the first location comprises determining if the type of needed mobile ground equipment is available or unavailable at the first location during the first target turn time. In some embodiments, the instructions are executed with the at least one processor so that the following step is also executed: determining, based on the status and/or the location of each mobile ground equipment item, that the type of needed mobile ground equipment is unavailable at the first location; and displaying, on a graphical user interface ("GUI") of a first remote user device, a notification that indicates the type of needed mobile ground equipment is unavailable at the first location In some embodiments, the notification is a push notification; wherein the GUI of the first remote user device is configured to display a parent window and a child window; and wherein the instructions are executed with the at least one processor so that the following steps are also executed: receiving, via the GUI of the first remote user device, an indication that the notification is selected; and in response to the receipt of the indication that the notification is selected, displaying, on the GUI of the first remote user device, the child window that includes additional information regarding the notification while bypassing the display of the parent window on the GUI of the first remote user device. In some embodiments, the instructions are executed with the at least one processor so that the following step is also executed: displaying, on the GUI of the first remote user device, a request to change the status of the nearby available equipment from available to unavailable. In some embodiments, the instructions are executed with the at least one processor so that the following steps are also executed: receiving, via the GUI, the request to change the status of the nearby available equipment from available to unavailable; and in response to the receipt of the request, sending, to a GUI of a second user device a request, for the nearby available equipment to be moved from the second location. In some embodiments, a first beacon of the beacon(s) is coupled to a first mobile ground equipment item; wherein the first beacon is operably coupled to a sensor associated with the first mobile ground equipment item; wherein first ground equipment data sent from the first beacon comprises data from the sensor; and wherein the status of the first mobile ground equipment item is based on the data from the sensor. In some embodiments, a first beacon of the beacon(s) is coupled to a first mobile ground equipment item; wherein the first beacon sends first ground equipment data associated with the first mobile ground equipment item; and wherein the instructions are executed with the at least one processor so that the following steps are also executed: detecting, using a first remote user device, that the first remote user device is in proximity to the first mobile ground equipment item; creating, using the first remote user device, a report to document the status of the first mobile ground equipment item; wherein the report comprises data fields; and auto-populating, in response to the detection that the first remote user device is in proximity to the first mobile ground equipment item and in response to the creation of the report, the first ground equipment data into at least a portion of the data fields of the report.

The present disclosure also introduces a method monitoring mobile ground equipment items, the method comprising: transmitting, to gateway(s) and from beacon(s) coupled to the mobile ground equipment item(s), ground equipment data; receiving, by one or more processors, the ground equipment data from the gateway(s); identifying, using the one or more processors and based on the ground equipment data for each mobile ground equipment item, a status and/or a location of each mobile ground equipment item; identifying, using the one or more processors, an equipment list for a turnaround of an aircraft at a first location, wherein the equipment list comprises a type of needed mobile ground equipment; and determining, using the one or more processors and based on the status and/or the location of each mobile ground equipment item, if the type of needed mobile ground equipment is available or unavailable at the first location. In some embodiments, the method also includes: identifying, using the one or more processors and when it has been determined that the type of needed mobile ground equipment is unavailable at the first location, a mobile ground equipment item that is available at a second location; wherein the mobile ground equipment item that is available at the second location is nearby available equipment; and identifying, using the one or more processors, the second location of the nearby available equipment. In some embodiments, the method also includes displaying, on a graphical user interface ("GUI") of a first remote user device, information relating to the second location of the nearby available equipment. In some embodiments, identifying the equipment list for the turnaround of the aircraft at the first location comprises identifying a first target turn time associated with the turnaround, wherein the first target turn time is a period of time; and wherein determining, based on the status and/or the location of each mobile ground equipment item, if the type of needed mobile ground equipment is available or unavailable at the first location comprises determining if the type of needed mobile ground equipment is available or unavailable at the first location during the first target turn time. In some embodiments, the method also includes: determining, using the one or more processors and based on the status and/or the location of each mobile ground equipment item, that the type of needed mobile ground equipment is unavailable at the first location; and displaying, on a graphical user interface ("GUI") of a first remote user device, a notification that indicates the type of needed mobile ground equipment is unavailable at the first location. In some embodiments, the notification is a push notification; wherein the GUI of the first remote user device is configured to display a parent window and a child window; and wherein the method further comprises: receiving, at the one or more processors and via the GUI of the first remote user device, an indication that the notification is selected; and in response to the receipt of the indication that the notification is selected, displaying, on the GUI of the first remote user device, the child window that includes additional information regarding the notification while bypassing the display of the parent window. In some embodiments, the method also includes displaying, on the GUI of the first remote user device, a request to change the status of the nearby available equipment from available to unavailable. In some embodiments, the method also includes: receiving, by the one or more processors and via the GUI, the request to change the status of the nearby available equipment from available to unavailable; and in response to the receipt of the request, sending, to a graphical user interface of a second remote user device, a request for the nearby available equipment to be moved from the second location. In some embodiments, a first beacon of the beacon(s) is coupled to a first mobile ground equipment item; wherein the first beacon is operably coupled to a sensor associated with the first mobile ground equipment item; wherein first ground equipment data sent from the first beacon comprises data from the sensor; and wherein the status of the first mobile ground equipment item is based on the data from the sensor. In some embodiments, a first beacon of the beacon(s) is coupled to a first mobile ground equipment item; wherein the first beacon sends first ground equipment data associated with the first mobile ground equipment item; and wherein the method further comprises: detecting, using a first remote user device, that the first remote user device is in proximity to the first mobile ground equipment item; creating, using the first remote user device, a report to document the status of the first mobile ground equipment item; wherein the report comprises data fields; and auto-populating, using the one or more processors and the first remote user device, the first ground equipment data into at least a portion of the data fields of the report; wherein the auto-population is in response to the detection that the first remote user device is in proximity to the first mobile ground equipment item and in response to the creation of the report.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A, B, or both A and B." The phrase "one or more of the following: A, B, and C" should be understood to mean "A, B, C, A and B, B and C, A and C, or all three of A, B, and C." The phrase "one or more of A, B, and C" should be understood to mean "A, B, C, A and B, B and C, A and C, or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A system comprising a non-transitory computer readable medium having stored thereon a plurality of instructions, wherein the instructions are executed with at least one processor so that the following steps are executed:
   receiving equipment data from beacons, wherein each of the beacons is coupled to an equipment item and configured to transmit the equipment data associated with the equipment item to which the beacon is coupled;
   identifying, based on the equipment data for each equipment item, a status and/or a location of each equipment item;
   identifying an equipment list associated with a period of time that a vehicle is expected to stay at a first location, wherein the equipment list comprises a type of needed equipment;
   determining, based on the status and/or the location of each equipment item, that the type of needed equipment is unavailable at the first location during the period of time; and
   displaying, on a graphical user interface ("GUI") of a first remote user device, a notification that indicates the type of needed equipment is unavailable at the first location during the period of time.

2. The system of claim 1, wherein the vehicle is an aircraft.

3. The system of claim 1,
   wherein the notification is a push notification;
   wherein the GUI of the first remote user device is configured to display a parent window and a child window; and
   wherein the instructions are executed with the at least one processor so that the following steps are also executed:
      receiving, via the GUI of the first remote user device, an indication that the notification is selected; and
      in response to the receipt of the indication that the notification is selected, displaying, on the GUI of the first remote user device, the child window that includes additional information regarding the notification while bypassing the display of the parent window on the GUI of the first remote user device.

4. The system of claim 1,
   wherein a first beacon of the beacons is coupled to a first equipment item;
   wherein the first beacon is operably coupled to a sensor associated with the first equipment item;
   wherein first equipment data sent from the first beacon comprises data from the sensor; and
   wherein the instructions are executed with the at least one processor so that the following step is also executed:
      identifying a status of the first equipment item based on the data from the sensor.

5. The system of claim 1,
   wherein a first beacon of the beacons is coupled to a first equipment item;
   wherein the first beacon sends first equipment data associated with the first equipment item; and
   wherein the instructions are executed with the at least one processor so that the following steps are also executed:
      detecting, using a third remote user device, that the third remote user device is in proximity to the first equipment item;
      creating, using the third remote user device, a report to document the status of the first equipment item;
      wherein the report comprises data fields; and
      auto-populating, in response to the detection that the third remote user device is in proximity to the first equipment item and in response to the creation of the report, the first equipment data into at least a portion of the data fields of the report.

6. The system of claim 1,
wherein the instructions are executed with the at least one processor so that the following steps are also executed:
identifying an equipment item that is available at a second location during the period of time;
wherein the equipment item that is available at the second location during the period of time is nearby available equipment;
and
identifying the second location of the nearby available equipment.

7. The system of claim 6,
wherein the instructions are executed with the at least one processor so that the following step is also executed:
displaying, on the GUI of the first remote user device, information relating to the second location of the nearby available equipment.

8. The system of claim 7,
wherein the instructions are executed with the at least one processor so that the following steps are also executed:
displaying, on the GUI of the first remote user device, a request to change the status of the nearby available equipment from available to unavailable;
receiving, via the GUI of the first remote user device, the request to change the status of the nearby available equipment from available to unavailable;
in response to the receipt of the request, sending, to a GUI of a second remote user device a request, for the nearby available equipment to be moved from the second location; and
displaying, on the GUI of the first remote user device, a request to change the status of the nearby available equipment from available to unavailable.

9. A system comprising a non-transitory computer readable medium having stored thereon a plurality of instructions, wherein the instructions are executed with at least one processor so that the following steps are executed:
receiving equipment data from beacons, wherein each of the beacons is coupled to an equipment item and configured to transmit the equipment data associated with the equipment item to which the beacon is coupled;
identifying, based on the equipment data for each equipment item, a status and/or a location of each equipment item;
identifying an equipment list associated with a period of time that a vehicle is expected to stay at a first location, wherein the equipment list comprises a type of needed equipment; and
determining, based on the status and/or the location of each equipment item, if the type of needed equipment is available or unavailable at the first location during the period of time;
wherein a first beacon of the beacons is coupled to a first equipment item;
wherein the first beacon is operably coupled to a sensor associated with the first equipment item;
wherein first equipment data sent from the first beacon comprises data from the sensor; and
wherein the status of the first equipment item is based on the data from the sensor.

10. The system of claim 9, wherein the vehicle is an aircraft.

11. The system of claim 9,
wherein the instructions are executed with the at least one processor so that the following steps are also executed:
determining, based on the status of the first equipment item, that the type of needed equipment is unavailable at the first location during the period of time;
displaying, on a graphical user interface ("GUI") of a first remote user device, a notification that indicates the type of needed equipment is unavailable at the first location during the period of time;
wherein the notification is a push notification; and
wherein the GUI of the first remote user device is configured to display a parent window and a child window;
receiving, via the GUI of the first remote user device, an indication that the notification is selected; and
in response to the receipt of the indication that the notification is selected, displaying, on the GUI of the first remote user device, the child window that includes additional information regarding the notification while bypassing the display of the parent window on the GUI of the first remote user device.

12. The system of claim 9,
wherein the instructions are executed with the at least one processor so that the following steps are also executed:
detecting, using a third remote user device, that the third remote user device is in proximity to the first equipment item;
creating, using the third remote user device, a report to document the status of the first equipment item;
wherein the report comprises data fields; and
auto-populating, in response to the detection that the third remote user device is in proximity to the first equipment item and in response to the creation of the report, the first equipment data into at least a portion of the data fields of the report.

13. The system of claim 9,
wherein the instructions are executed with the at least one processor so that the following steps are also executed:
identifying, when it has been determined that the type of needed equipment is unavailable at the first location during the period of time, an equipment item that is available at a second location during the period of time;
wherein the equipment item that is available at the second location during the period of time is nearby available equipment;
and
identifying the second location of the nearby available equipment.

14. The system of claim 13,
wherein the instructions are executed with the at least one processor so that the following step is also executed:
displaying, on a graphical user interface ("GUI") of a first remote user device, information relating to the second location of the nearby available equipment.

15. The system of claim 14,
wherein the instructions are executed with the at least one processor so that the following steps are also executed:
displaying, on the GUI of the first remote user device, a request to change the status of the nearby available equipment from available to unavailable;
receiving, via the GUI of the first remote user device, the request to change the status of the nearby available equipment from available to unavailable;

in response to the receipt of the request, sending, to a GUI of a second user device a request, for the nearby available equipment to be moved from the second location; and displaying, on the GUI of the first remote user device, a request to change the status of the nearby available equipment from available to unavailable.

16. A system comprising a non-transitory computer readable medium having stored thereon a plurality of instructions, wherein the instructions are executed with at least one processor so that the following steps are executed:

receiving equipment data from beacons, wherein each of the beacons is coupled to an equipment item and configured to transmit the equipment data associated with the equipment item to which the beacon is coupled;

identifying, based on the equipment data for each equipment item, a status and/or a location of each equipment item;

identifying an equipment list associated with a period of time that a vehicle is expected to stay at a first location, wherein the equipment list comprises a type of needed equipment; and determining, based on the status and/or the location of each equipment item, if the type of needed equipment is available or unavailable at the first location during the period of time;

wherein a first beacon of the beacons is coupled to a first equipment item;

wherein the first beacon sends first equipment data associated with the first equipment item; and detecting, using a first remote user device, that the first remote user device is in proximity to the first equipment item;

creating, using the first remote user device, a report to document the status of the first equipment item;

wherein the report comprises data fields; and auto-populating, in response to the detection that the first remote user device is in proximity to the first equipment item and in response to the creation of the report, the first equipment data into at least a portion of the data fields of the report.

17. The system of claim 16, wherein the vehicle is an aircraft.

18. The system of claim 16,
wherein the instructions are executed with the at least one processor so that the following steps are also executed:
determining, based on the status of the first equipment item, that the type of needed equipment is unavailable at the first location during the period of time; and
displaying, on a graphical user interface ("GUI") of a second remote user device, a notification that indicates the type of needed equipment is unavailable at the first location during the period of time;
wherein the notification is a push notification; and
wherein the GUI of the second remote user device is configured to display a parent window and a child window;
receiving, via the GUI of the second remote user device, an indication that the notification is selected; and
in response to the receipt of the indication that the notification is selected, displaying, on the GUI of the second remote user device, the child window that includes additional information regarding the notification while bypassing the display of the parent window on the GUI of the second remote user device.

19. The system of claim 16,
wherein the instructions are executed with the at least one processor so that the following steps are also executed:
identifying, when it has been determined that the type of needed equipment is unavailable at the first location during the period of time, an equipment item that is available at a second location during the period of time;
wherein the equipment item that is available at the second location during the period of time is nearby available equipment;
and
identifying the second location of the nearby available equipment.

20. The system of claim 19,
wherein the instructions are executed with the at least one processor so that the following step is also executed:
displaying, on a graphical user interface ("GUI") of a second remote user device, information relating to the second location of the nearby available equipment.

21. The system of claim 20,
wherein the instructions are executed with the at least one processor so that the following steps are also executed:
displaying, on the GUI of the second remote user device, a request to change the status of the nearby available equipment from available to unavailable;
receiving, via the GUI of the second remote user device, the request to change the status of the nearby available equipment from available to unavailable;
in response to the receipt of the request, sending, to a GUI of a third remote user device a request, for the nearby available equipment to be moved from the second location; and
displaying, on the GUI of the second remote user device, a request to change the status of the nearby available equipment from available to unavailable.

22. A system comprising a non-transitory computer readable medium having stored thereon a plurality of instructions, wherein the instructions are executed with at least one processor so that the following steps are executed:

receiving equipment data from beacons, wherein each of the beacons is coupled to an equipment item and configured to transmit the equipment data associated with the equipment item to which the beacon is coupled;

identifying, based on the equipment data for each equipment item, a status and/or a location of each equipment item;

identifying an equipment list associated with a period of time that a vehicle is expected to stay at a first location, wherein the equipment list comprises a type of needed equipment;

determining, based on the status and/or the location of each equipment item, if the type of needed equipment is available or unavailable at the first location during the period of time;

identifying, when it has been determined that the type of needed equipment is unavailable at the first location during the period of time, an equipment item that is available at a second location during the period of time;

wherein the equipment item that is available at the second location during the period of time is nearby available equipment; and identifying the second location of the nearby available equipment.

23. The system of claim 22,
wherein the instructions are executed with the at least one processor so that the following step is also executed:
displaying, on a graphical user interface ("GUI") of a first remote user device, information relating to the second location of the nearby available equipment.

24. The system of claim 23,
wherein the instructions are executed with the at least one processor so that the following steps are also executed:
displaying, on the GUI of the first remote user device, a request to change the status of the nearby available equipment from available to unavailable;
receiving, via the GUI of the first remote user device, the request to change the status of the nearby available equipment from available to unavailable; and
in response to the receipt of the request, sending, to a GUI of a second remote user device a request, for the nearby available equipment to be moved from the second location.

25. The system of claim 23,
wherein the instructions are executed with the at least one processor so that the following step is also executed:
displaying, on the GUI of the first remote user device, a request to change the status of the nearby available equipment from available to unavailable.

26. The system of claim 22, wherein the vehicle is an aircraft.

27. The system of claim 22,
wherein the instructions are executed with the at least one processor so that the following steps are also executed:
determining, based on the status and/or the location of each equipment item, that the type of needed equipment is unavailable at the first location during the period of time;
displaying, on a graphical user interface ("GUI") of a first remote user device, a notification that indicates the type of needed equipment is unavailable at the first location during the period of time;
wherein the notification is a push notification; and
wherein the GUI of the first remote user device is configured to display a parent window and a child window;
receiving, via the GUI of the first remote user device, an indication that the notification is selected; and
in response to the receipt of the indication that the notification is selected, displaying, on the GUI of the first remote user device, the child window that includes additional information regarding the notification while bypassing the display of the parent window on the GUI of the first remote user device.

28. A method of monitoring equipment items, the method comprising:
receiving, by one or more processors, equipment data for the equipment items;
identifying, using the one or more processors and based on the equipment data for each equipment item, a status and/or a location of each equipment item;
identifying, using the one or more processors, an equipment list associated with a period of time that a vehicle is expected to stay at a first location, wherein the equipment list comprises a type of needed equipment; and determining, using the one or more processors and based on the status and/or the location of each equipment item, if the type of needed equipment is available or unavailable at the first location during the period of time;
wherein a first beacon is coupled to a first equipment item;
wherein the first beacon is operably coupled to a sensor associated with the first equipment item;
wherein first equipment data sent from the first beacon comprises data from the sensor; and
wherein the status of the first equipment item is based on the data from the sensor.

29. The method of claim 28,
wherein the equipment data is received from gateways; and
wherein the vehicle is an aircraft.

30. The method of claim 28, further comprising:
determining, based on the status of the first equipment item, that the type of needed equipment is unavailable at the first location during the period of time;
displaying, on a graphical user interface ("GUI") of a first remote user device, a notification that indicates the type of needed equipment is unavailable at the first location during the period of time;
wherein the notification is a push notification; and
wherein the GUI of the first remote user device is configured to display a parent window and a child window;
receiving, via the GUI of the first remote user device, an indication that the notification is selected; and
in response to the receipt of the indication that the notification is selected, displaying, on the GUI of the first remote user device, the child window that includes additional information regarding the notification while bypassing the display of the parent window on the GUI of the first remote user device.

31. The method of claim 28, further comprising:
detecting, using a third remote user device, that the third remote user device is in proximity to the first equipment item;
creating, using the third remote user device, a report to document the status of the first equipment item;
wherein the report comprises data fields; and
auto-populating, in response to the detection that the third remote user device is in proximity to the first equipment item and in response to the creation of the report, the first equipment data into at least a portion of the data fields of the report.

32. The method of claim 28, further comprising:
identifying, when it has been determined that the type of needed equipment is unavailable at the first location during the period of time, an equipment item that is available at a second location during the period of time;
wherein the equipment item that is available at the second location during the period of time is nearby available equipment; and
identifying the second location of the nearby available equipment.

33. The system of claim 32, further comprising:
displaying, on a graphical user interface ("GUI") of a first remote user device, information relating to the second location of the nearby available equipment.

34. The system of claim 33, further comprising:
displaying, on the GUI of the first remote user device, a request to change the status of the nearby available equipment from available to unavailable;
receiving, via the GUI of the first remote user device, the request to change the status of the nearby available equipment from available to unavailable;
in response to the receipt of the request, sending, to a GUI of a second user device a request, for the nearby available equipment to be moved from the second location; and
displaying, on the GUI of the first remote user device, a request to change the status of the nearby available equipment from available to unavailable.

35. A method of monitoring equipment items, the method comprising:
receiving, by one or more processors, equipment data for the equipment items;
identifying, using the one or more processors and based on the equipment data for each equipment item, a status and/or a location of each equipment item;
identifying, using the one or more processors, an equipment list associated with a period of time that a vehicle is expected to stay at a first location, wherein the equipment list comprises a type of needed equipment;
determining, using the one or more processors and based on the status and/or the location of each equipment item, if the type of needed equipment is available or unavailable at the first location during the period of time;
wherein a first beacon is coupled to a first equipment item; and
wherein the first beacon sends first equipment data associated with the first equipment item;
detecting, using a first remote user device, that the first remote user device is in proximity to the first equipment item;
creating, using the first remote user device, a report to document the status of the first equipment item;
wherein the report comprises data fields; and
auto-populating, in response to the detection that the first remote user device is in proximity to the first equipment item and in response to the creation of the report, the first equipment data into at least a portion of the data fields of the report.

36. The method of claim 35,
wherein the equipment data is received from gateways; and
wherein the vehicle is an aircraft.

37. The method of claim 35, further comprising:
determining, based on the status of the first equipment item, that the type of needed equipment is unavailable at the first location during the period of time; and
displaying, on a graphical user interface ("GUI") of a second remote user device, a notification that indicates the type of needed equipment is unavailable at the first location during the period of time;
wherein the notification is a push notification; and
wherein the GUI of the second remote user device is configured to display a parent window and a child window;
receiving, via the GUI of the second remote user device, an indication that the notification is selected; and
in response to the receipt of the indication that the notification is selected, displaying, on the GUI of the second remote user device, the child window that includes additional information regarding the notification while bypassing the display of the parent window on the GUI of the second remote user device.

38. The method of claim 35, further comprising:
identifying, when it has been determined that the type of needed equipment is unavailable at the first location during the period of time, an equipment item that is available at a second location during the period of time;
wherein the equipment item that is available at the second location during the period of time is nearby available equipment;
and
identifying the second location of the nearby available equipment.

39. The method of claim 38, further comprising:
displaying, on a graphical user interface ("GUI") of a second remote user device, information relating to the second location of the nearby available equipment.

40. The method of claim 39, further comprising:
displaying, on the GUI of the second remote user device, a request to change the status of the nearby available equipment from available to unavailable;
receiving, via the GUI of the second remote user device, the request to change the status of the nearby available equipment from available to unavailable;
in response to the receipt of the request, sending, to a GUI of a third remote user device a request, for the nearby available equipment to be moved from the second location; and
displaying, on the GUI of the second remote user device, a request to change the status of the nearby available equipment from available to unavailable.

41. A method of monitoring equipment items, the method comprising:
receiving, by one or more processors, equipment data for the equipment items;
identifying, using the one or more processors and based on the equipment data for each equipment item, a status and/or a location of each equipment item;
identifying, using the one or more processors, an equipment list associated with a period of time that a vehicle is expected to stay at a first location, wherein the equipment list comprises a type of needed equipment;
determining, using the one or more processors and based on the status and/or the location of each equipment item, if the type of needed equipment is available or unavailable at the first location during the period of time;
identifying, using the one or more processors, when it has been determined that the type of needed equipment is unavailable at the first location during the period of time, an equipment item that is available at a second location during the period of time;
wherein the equipment item that is available at the second location during the period of time is nearby available equipment;
and
identifying, using the one or more processors, the second location of the nearby available equipment.

42. The method of claim 41, further comprising:
displaying, on a graphical user interface ("GUI") of a first remote user device, information relating to the second location of the nearby available equipment.

43. The method of claim 42, further comprising:
displaying, on the GUI of the first remote user device, a request to change the status of the nearby available equipment from available to unavailable;

receiving, via the GUI of the first remote user device, the request to change the status of the nearby available equipment from available to unavailable; and in response to the receipt of the request, sending, to a GUI of a second remote user device a request, for the nearby available equipment to be moved from the second location.

44. The method of claim 42, further comprising:

displaying, on the GUI of the first remote user device, a request to change the status of the nearby available equipment from available to unavailable.

45. The method of claim 41, wherein the equipment data is received from gateways; and wherein the vehicle is an aircraft.

46. The method of claim 41, further comprising:

determining, based on the status and/or the location of each equipment item, that the type of needed equipment is unavailable at the first location during the period of time;

displaying, on a graphical user interface ("GUI") of a first remote user device, a notification that indicates the type of needed equipment is unavailable at the first location during the period of time;

wherein the notification is a push notification; and wherein the GUI of the first remote user device is configured to display a parent window and a child window;

receiving, via the GUI of the first remote user device, an indication that the notification is selected; and in response to the receipt of the indication that the notification is selected, displaying, on the GUI of the first remote user device, the child window that includes additional information regarding the notification while bypassing the display of the parent window on the GUI of the first remote user device.

47. A method of monitoring equipment items, the method comprising:

receiving, by one or more processors, equipment data for the equipment items;

identifying, using the one or more processors and based on the equipment data for each equipment item, a status and/or a location of each equipment item;

identifying, using the one or more processors, an equipment list associated with a period of time that a vehicle is expected to stay at a first location, wherein the equipment list comprises a type of needed equipment;

determining, using the one or more processors, and based on the status and/or the location of each equipment item, that the type of needed equipment is unavailable at the first location during the period of time; and displaying, on a graphical user interface ("GUI") of a first remote user device, a notification that indicates the type of needed equipment is unavailable at the first location during the period of time.

48. The method of claim 47, wherein the equipment data is received from gateways; and wherein the vehicle is an aircraft.

49. The method of claim 47, wherein the notification is a push notification;

wherein the GUI of the first remote user device is configured to display a parent window and a child window; and wherein the method further comprises:

receiving, via the GUI of the first remote user device, an indication that the notification is selected; and in response to the receipt of the indication that the notification is selected, displaying, on the GUI of the first remote user device, the child window that includes additional information regarding the notification while bypassing the display of the parent window on the GUI of the first remote user device.

50. The method of claim 47, wherein a first beacon of the beacons is coupled to a first equipment item;

wherein the first beacon is operably coupled to a sensor associated with the first equipment item;

wherein first equipment data sent from the first beacon comprises data from the sensor; and wherein the method further comprises:

identifying a status of the first equipment item based on the data from the sensor.

51. The method of claim 47, wherein a first beacon of the beacons is coupled to a first equipment item;

wherein the first beacon sends first equipment data associated with the first equipment item; and wherein the method further comprises:

detecting, using a third remote user device, that the third remote user device is in proximity to the first equipment item;

creating, using the third remote user device, a report to document the status of the first equipment item;

wherein the report comprises data fields; and auto-populating, in response to the detection that the third remote user device is in proximity to the first equipment item and in response to the creation of the report, the first equipment data into at least a portion of the data fields of the report.

52. The method of claim 47, further comprising:

identifying an equipment item that is available at a second location during the period of time;

wherein the equipment item that is available at the second location during the period of time is nearby available equipment;

and identifying the second location of the nearby available equipment.

53. The method of claim 52, further comprising:

displaying, on the GUI of the first remote user device, information relating to the second location of the nearby available equipment.

54. The method of claim 53, further comprising:

displaying, on the GUI of the first remote user device, a request to change the status of the nearby available equipment from available to unavailable;

receiving, via the GUI of the first remote user device, the request to change the status of the nearby available equipment from available to unavailable;

in response to the receipt of the request, sending, to a GUI of a second remote user device a request, for the nearby available equipment to be moved from the second location; and displaying, on the GUI of the first remote user device, a request to change the status of the nearby available equipment from available to unavailable.

* * * * *